US008855367B2

(12) United States Patent
Kido

(10) Patent No.: US 8,855,367 B2
(45) Date of Patent: Oct. 7, 2014

(54) ENVIRONMENT RECOGNITION DEVICE AND ENVIRONMENT RECOGNITION METHOD

(75) Inventor: Shinnosuke Kido, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 243 days.

(21) Appl. No.: 13/457,728

(22) Filed: Apr. 27, 2012

(65) Prior Publication Data

US 2012/0288146 A1 Nov. 15, 2012

(30) Foreign Application Priority Data

May 12, 2011 (JP) ................................ 2011-107691

(51) Int. Cl.
*G06K 9/00* (2006.01)
(52) U.S. Cl.
CPC ................................... *G06K 9/00791* (2013.01)
USPC .......................................................... 382/103
(58) Field of Classification Search
None
See application file for complete search history.

(56) References Cited

U.S. PATENT DOCUMENTS

2003/0099377 A1* 5/2003 Hanawa ......................... 382/104
2010/0074469 A1* 3/2010 Nakamori et al. ............ 382/103
2014/0016826 A1* 1/2014 Fairfield et al. ............... 382/104

FOREIGN PATENT DOCUMENTS

JP 3349060 B2 11/2002

* cited by examiner

*Primary Examiner* — Atiba O Fitzpatrick
(74) *Attorney, Agent, or Firm* — McDermott Will & Emery LLP

(57) ABSTRACT

There are provided an environment recognition device and an environment recognition method. The environment recognition device provisionally determines a specific object corresponding to a target portion from a luminance of a target portion, groups, as a target object, adjacent target portions provisionally determined to correspond to a same specific object, groups, as the target object, the target portions corresponding to a same specific object with respect to the target object and the luminance, when differences in horizontal distance and in height from the target object of target portions fall within a first predetermined range, and determines that the target object is the specific object when a ratio of target portion of which luminance is included in a predetermined luminance range with respect to all target portions in a specific region in the target object is equal to or more than a predetermined threshold value.

12 Claims, 15 Drawing Sheets

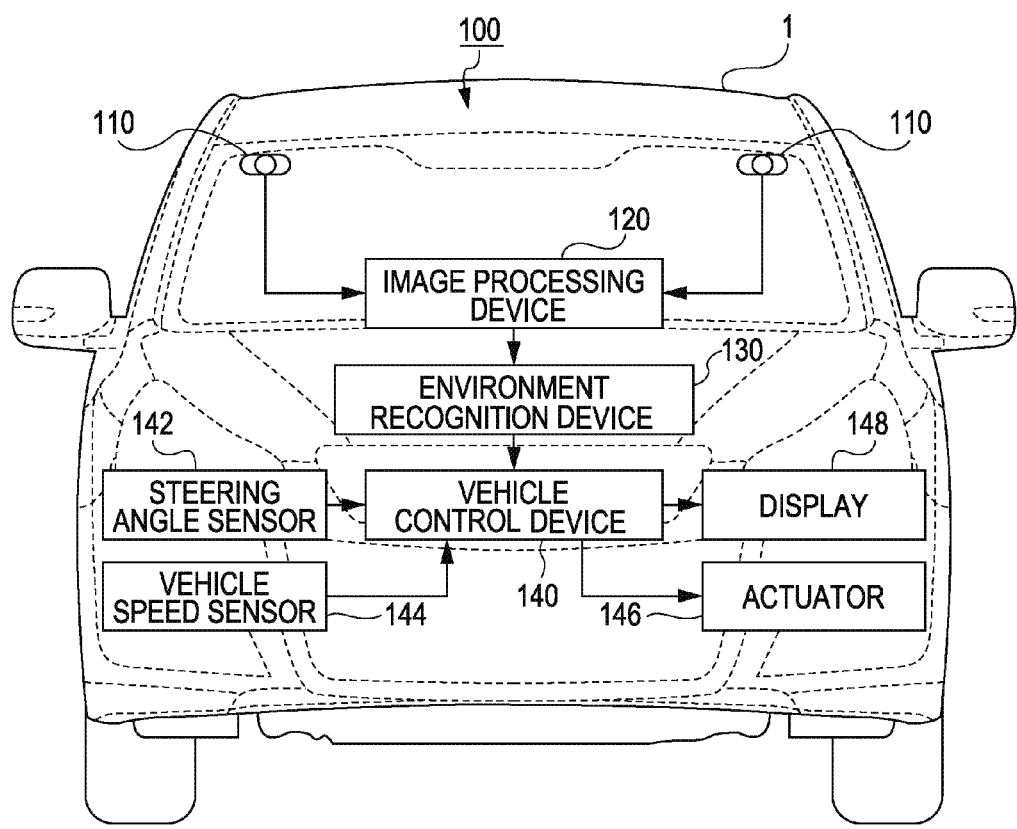

FIG. 4

| IDENTIFICATION NUMBER | | 1 | 2 | 3 | 4 | 5 | 6 | 7 | 8 |
|---|---|---|---|---|---|---|---|---|---|
| SPECIFIC OBJECT | | TRAFFIC LIGHT (RED) | TRAFFIC LIGHT (YELLOW) | TRAFFIC LIGHT (BLUE) | TAIL LAMP (RED) | TURN SIGNAL (ORANGE) | ROAD SIGN (RED) | ROAD SIGN (BLUE) | ROAD SIGN (GREEN) |
| LUMINANCE RANGE | RED | ≥150 | ≥150 | ≤50 | ≥200 | ≥100 | ≥100 | ≤50 | ≤100 |
| | GREEN | ≤100 | ≥100 | ≥150 | ≤50 | ≥60 | ≤60 | ≤50 | ≥150 |
| | BLUE | ≤50 | ≤50 | ≥100 | ≤50 | ≤50 | ≤50 | ≥200 | ≤100 |
| WIDTH RANGE (m) | | 0.2 TO 0.4 | 0.2 TO 0.4 | 0.2 TO 0.4 | 0.1 TO 0.2 | 0.1 TO 0.2 | 0.3 TO 1.0 | 0.3 TO 1.0 | 0.3 TO 1.0 | ated.

ENVIRONMENT RECOGNITION DEVICE AND ENVIRONMENT RECOGNITION METHOD

CROSS-REFERENCE TO RELATED APPLICATIONS

The present application claims priority from Japanese Patent Application No. 2011-107691 filed on May 12, 2011, the entire contents of which are hereby incorporated by reference.

BACKGROUND OF THE INVENTION

1. Field of the Invention

The present invention relates to an environment recognition device and an environment recognition method for recognizing a target object based or a luminance of the target object in a detection area.

2. Description of Related Art

Conventionally, a technique has been known that detects a target object such as an obstacle including a vehicle and a traffic light located in front of a subject vehicle for performing control to avoid collision with the detected target object and to maintain a safe distance between the subject vehicle and the preceding vehicle (for example, Japanese Patent No. 3349060 (Japanese Patent Application Laid-Open (JP-A) No. 10-283461).

Further, in such techniques, there is a technique that performs more advanced control. Specifically, it not only specifies a target object uniformly as a solid object, but further determines whether the detected target object is a preceding vehicle that is running at the same speed as the subject vehicle or a fixed object that does not move in this case, when the target object is detected by capturing an image of a detection area, it is necessary to extract (cut out) the target object from the captured image before specifying what the target object is.

For example, when the captured image is a color image, there may be a method for extracting, as a target object, a set of pixels having a same luminance (color).

However, when color or sizes of a character and a graphic, which axe displayed on a light-emitting traffic sign or a digital signage, are similar to those of a lighting portion of a traffic light, simply grouping the plural pixels having the similar color characteristics may cause the character and the graphic to be falsely recognized as the traffic light. Even if an indicator is larger than the lighting portion of the traffic light, a displayed character and a graphic are not always continuously drawn depending on a display mode of the indicator, and may be separately grouped. As a result, the character and the graphic are unlikely to be recognized as being displayed on the same substance. Accordingly, the inventor of the present application has developed a technique for further unifying grouped target objects according to conditions, and for example, distinguishing between a traffic light and a light-emitting traffic sign.

However, in this kind of technique, small light-emitting objects may be unified against the intention, and a specific object that is not originally desired to be recognized may be falsely recognized as a specific object. For example, multiple lights installed in a tunnel with a narrow interval are located in proximity in a captured image, and accordingly, the lights are of a size close to that of a traffic light, as a result of the above unifying technique. As a result, the lights may be falsely recognized as a traffic light.

BRIEF SUMMARY OF THE INVENTION

The present invention has been devised in order to solve the above problem and an object thereof is to provide an environment recognition device and an environment recognition method that are capable of improving the accuracy of specifying of a target object to avoid false recognition.

In order to solve the above problems, an aspect of the present invention, provides an environment recognition device that includes: a data retaining unit that retains association between a range of luminance and a specific object; a luminance obtaining unit that obtains a luminance of a target portion in a detection area of a luminance image; a specific object provisional determining unit that provisionally determines a specific object corresponding to the target portion from the luminance on the basis of the association retained in the data retaining unit; a target portion grouping unit that groups adjacent target portions provisionally determined, to correspond to a same specific object into a target object; a target object grouping unit that groups another target portion, between which position and the position of the given target object differences in a horizontal and a vertical directions tall within a first predetermined range and which corresponds to a same specific object based on the luminances of the given target object and the another target portion, into the given target object; and a specific object determining unit that determines that a target object is a specific object when a ratio of target portions, of which luminances are within a predetermined luminance range, against all target portions in a specific region of the target object is equal to or more than a predetermined, threshold value.

The specific region may be a belt-like region extending in a horizontal direction passing through a center of the target object in a vertical direction.

The specific region may be a belt-like region extending in the vertical direction passing through the center of the target object in the horizontal direction.

The specific object may be a light-emitting portion of a traffic light.

In order to solve the above problems, another aspect of the present invention, provides an environment recognition method that includes: obtaining a luminance of a target portion in a detection area of a luminance image; provisionally determining a specific object corresponding to the target portion from the luminance of the target portion on the basis of association between a luminance range and a specific object, the association being retained in a data retaining unit; grouping adjacent target portions provisionally determined to correspond to a same specific object into a target object; grouping another target portion, between which position and the position of the given target object differences in a horizontal and a vertical directions fall within a first predetermined range and which corresponds to a same specific object based on the luminances of the given target object and the another target portion, into the given target object; and determining that a target object is a specific object when a ratio of target portions, of which luminances are within a predetermined luminance range, against all target portions in a specific region of the target object.

According to the present invention, the accuracy of specifying the target object can be improved, whereby false recognition can be avoided.

BRIEF DESCRIPTION OF THE SEVERAL VIEWS OF THE DRAWINGS

FIG. 1 is block diagram illustrating a connection relationship in an environment recognition system;

FIG. 4 is an explanatory diagram for explaining a specific object table;

DETAILED DESCRIPTION OF THE INVENTION

Figure 2A:
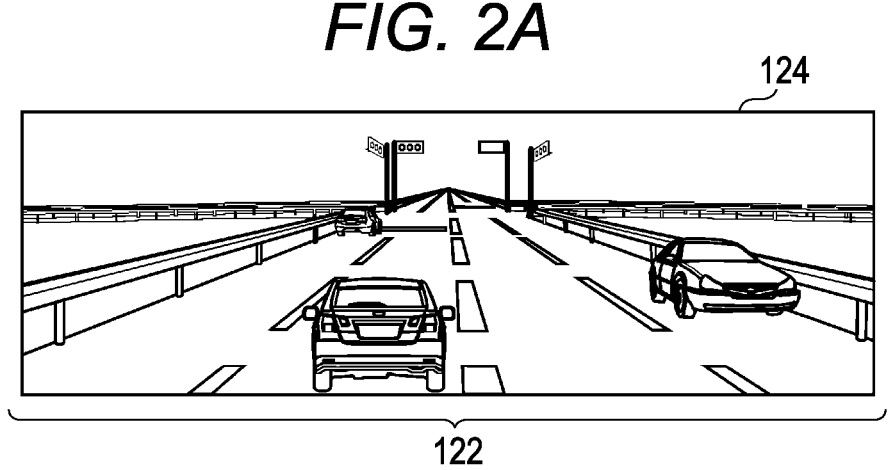
FIGS. 2A and 2B are explanatory diagrams for explaining a luminance image and a distance image.

A preferred embodiment of the present invention will be hereinafter explained in detail, with reference to attached drawings. The size, materials, and other specific numerical values shown in the embodiment are merely exemplification for the sake of easy understanding of the invention, and unless otherwise specified, they do not limit, the present invention. In the specification and the drawings, elements having substantially same functions and configurations are denoted with same reference numerals, and repeated explanation thereabout is omitted. Elements not directly related to the present invention are omitted in the drawings.

(Environment Recognition System 100)

FIG. 1 is a block diagram illustrating connection relationship in an environment recognition system 100. The environment recognition system 100 includes a plurality of imaging devices 110 (two imaging devices 110 in the present embodiment), an image processing device 120, an environment, recognition device 130, and a vehicle control device 140 that are provided in a vehicle 1.

The image capturing devices 110 include an imaging element such as a CCD (Charge-Coupled Device) and a CMOS (Complementary Metal-Oxide Semiconductor), and can obtain, a color image, that is, luminances of three color phases (red, green, blue) in units of pixels. In the present embodiment, color and luminance are dealt in the same way; if both wordings are included in one sentence, both can be read as luminance configuring color, or color having luminances. In this case, a color image captured by the imaging devices 110 is referred to as luminance image and is distinguished from a distance image to be explained later. The imaging devices 110 are disposed to be spaced apart from each other in a substantially horizontal direction so that optical axes of the two imaging devices 110 are substantially parallel in a proceeding direction of the vehicle 1. The imaging device 110 continuously generates image data obtained by capturing an image of a target object existing in a detection area in front of the vehicle 1 at every 1/60 seconds (60 fps), for example. In this case, the target object may be not only an independent three-dimensional object such as a vehicle, a traffic light, a road, and a guardrail, but also an illuminating portion such as a tail lamp, a turn signal, a traffic light that can be specified as a portion of a three-dimensional object. Each later-described functional unit in the embodiment performs processing in response to the update of such image data.

The image processing device 120 obtains image data from each of the two imaging devices 110, and derives, based on the two pieces of image data, parallax information including a parallax of any block (a set of a predetermined number of pixels) in the image and a display position representing a position of the any block in a display. Specifically, the image processing device 120 derives a parallax using so-called pattern matching that searches a block in one of the image data corresponding to the block optionally extracted from the other image data. The block is, for example, an array including four pixels in the horizontal direction and four pixels in the vertical direction in this embodiment, the horizontal, direction means a horizontal direction of the display for the captured image, and corresponds to the horizontal direction in the actual space. On the other hand, the vertical direction means a vertical direction of the display of for captured image, and corresponds to the vertical, direction in the actual space.

One way of performing the pattern matching is to compare luminance values (Y color difference signals) between two image data in units of a block indicating any image position. Examples include an SAD (Sum of Absolute Difference) obtaining a difference of luminance values, an SSD (Sum of Squared intensity Difference) squaring a difference and using the squared difference, and an NCC (Normalized Cross Correlation) adopting the degree of similarity of dispersion, values obtained by subtracting a mean luminance value from a luminance value of each pixel. The image processing device 120 performs such parallax deriving processing in units of a block on all the blocks appearing in the detection area (for example, 600 pixels×200 pixels). In this case, the block is assumed to include 4 pixels×4 pixels, but the number of pixels in the block may be set at any value.

Although the image processing device 120 can derive a parallax for each block serving as a detection resolution unit, it is impossible to recognize what kind of target object the block belongs to. Therefore, the parallax information is not derived per target object, but is independently derived per detection resolution unit (for example, per block) in the detection area. In this embodiment, an image obtained by associating the parallax information thus derived (corresponding to a later-described relative distance) with image data is referred to as a distance image.

Figure 2B:
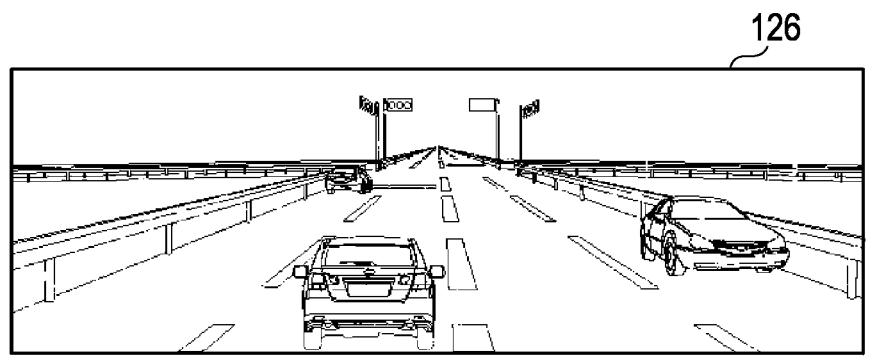

FIGS. 2A and 2B are explanatory diagrams for explaining a luminance image 124 and a distance image 126. For example, Assume that the luminance image (image data) 124 as shown in FIG. 2A is generated with regard to a detection area 122 by the two imaging devices 110. Here, for the sake of easy understanding, only one of the two luminance images 124 is schematically shown. In the present embodiment, the image processing device 120 obtains a parallax for each block from such luminance image 124, and forms the distance image 126 as shown in FIG. 2B. Each block of the distance image 126 is associated with a parallax of the block. In the drawing, for the sake of explanation, a block of which a parallax is derived is indicated by a black dot.

The parallax can be easily specified at an edge portion (portion where there is a large contrast difference between adjacent pixels) of an image, and therefore, the block from which parallax is derived, which is denoted with black dots in the distance image 126, is likely to also be an edge in the luminance image 124. Therefore, the luminance image 124 as shown in FIG. 2A and the distance image 126 as shown in FIG. 2B are similar in terms of outline of each target object.

The environment recognition device 130 obtains the luminance image 124 and the distance image 126 from the image processing device 120, and uses the luminances based on the luminance image 124 and a relative distance from the subject vehicle 1 based on the distance image 126 to determine which specific object the target object in the detection area 122 corresponds to. In this embodiment, the environment recognition device 130 uses a so-called stereo method to convert the parallax information for each block in the detection area 122 of the distance image 126 into three-dimensional position information including a relative distance, thereby deriving heights. The stereo method is a method using a triangulation method to derive a relative distance of a target object with respect to the imaging device 110 from the parallax of the target object. The environment recognition device 130 will, be explained later in detail.

The vehicle control device 140 avoids a collision with the target object specified by the environment recognition device 130 and performs control so as to maintain a safe distance from the preceding vehicle. More specifically, the vehicle control device 140 obtains a current cruising state of the vehicle 1 based on, for example, a steering angle sensor 142 for detecting a steering and a vehicle speed sensor 144 for detecting a speed of the vehicle 1, thereby control ling an actuator 146 to maintain a safe distance from the preceding vehicle. The actuator 146 is an actuator for vehicle control used to control a brake, a throttle valve, a steering angle and the like. When collision with a target object is expected, the vehicle control device 140 displays a warning (notification) of the expected collision on a display 148 provided in front, of a driver, and controls the actuator 146 to automatically decelerate the vehicle 1. The vehicle control device 140 can also be integrally formed with the environment recognition device 130.

(Environment Recognition Device 130)

Figure 3:
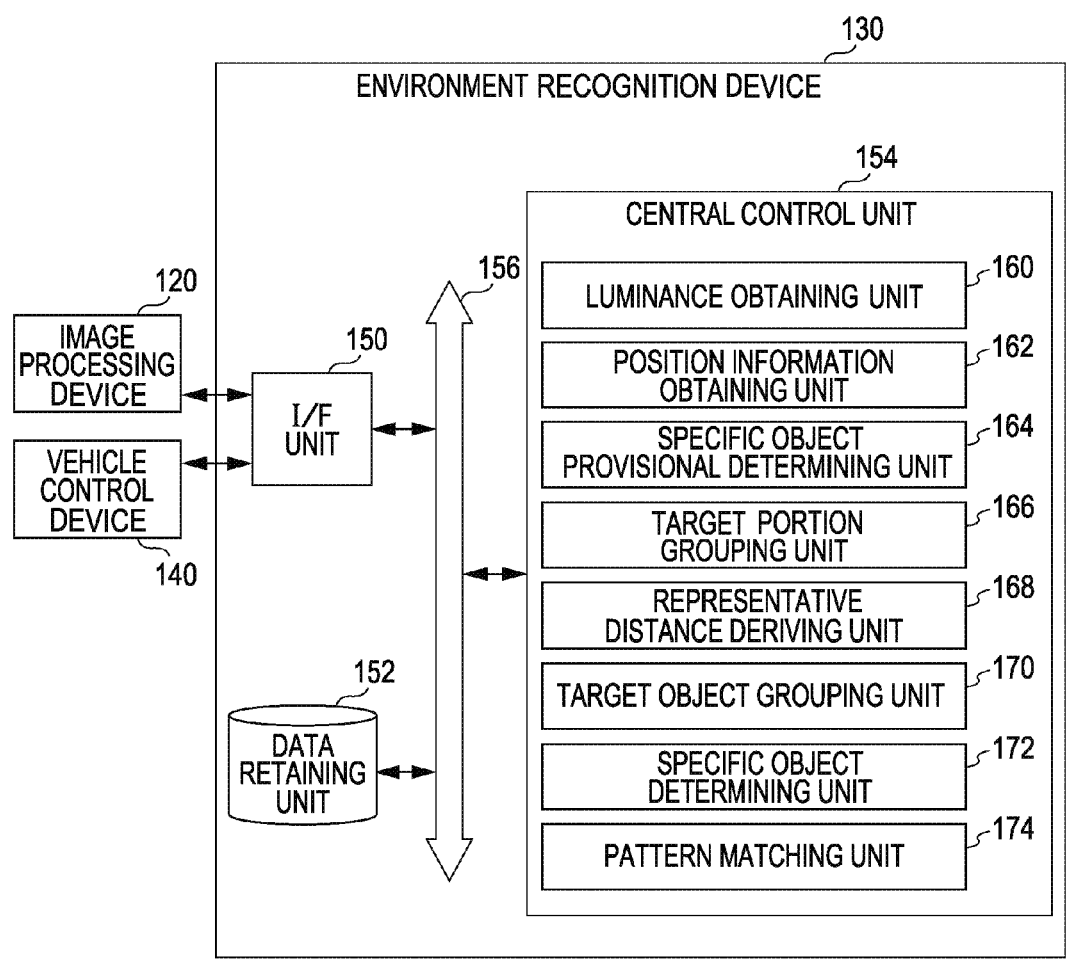
FIG. 3 is a functional block diagram schematically illustrating functions of an environment recognition device.

FIG. 3 is a functional block diagram schematically illustrating functions of an environment recognition device 130. As shown in FIG. 3, the environment recognition device 130 includes an I/F unit 150, a data retaining unit 152, and a central control unit 154.

The I/F unit 150 is an interface for interactive formation exchange with the image processing device 120 and the vehicle control device 140. The data retaining unit 152 is constituted by a RAM, a flash memory, an HDD and the like, and retains a specific object table (association) and various kinds of information required for processing performed by each functional unit explained below in addition, the data retaining unit 152 temporarily retains the luminance image 124 and the distance image 126 received from the image processing device 120. The specific object table is used as follows.

FIG. 4 is an explanatory diagram for explaining a specific object table 200. In the specific object table 200, a plurality of specific objects are associated with a luminance range 202 indicating a range of luminance and a width range 204 indicating a range of size of the specific objects. The specific objects include various objects required to be observed while the vehicle runs on the road, such as "traffic light (red)", "traffic light (yellow)", "traffic light (blue)", "tail lamp (red)", "turn signal (orange)", "road sign (red)", "road sign (blue)", and "road sign (green)". It is to be understood that the specific object is not limited to the objects in FIG. 4. The specific object table 200 defines the order of priority for specifying a specific object, and the environment recognition processing is performed in accordance with the order of priority for each specific object sequentially selected from the plurality of specific objects in the specific object table 200. Among the specific objects, for example, a specific object "traffic light (red)" is associated with luminance (red) "150 or more", luminance (green) "100 or less", luminance (blue) "50 or less", and width range "0.2 to 0.4 m".

In the present embodiment, based on the specific object table 200, a target portion among any target portions in the luminance image 124 is adopted as a candidate for any specific object if the target portion satisfies the condition of a luminance range 202 regarding the specific object. For example, if luminances of a target portion is included in the luminance range 202 of the specific object "traffic light (red)", the target portion is adopted as a candidate for the specific object "traffic light (red)". Then, when the target object made by grouping the target portions is extracted in a form which appears to be a specific object, for example, when the size of a grouped target object is included in the width range "0.2 to 0 m" of the "traffic light (red)", it is determined, to be a specific object. The target portion determined to be the specific object is labeled with an identification number unique to the specific object. IA pixel or a block made by collecting pixels may be used as the target portion, and in the present embodiment, pixels are used the target portions for the sake of convenience of explanation.

The central control unit 154 is made of a semiconductor integrated circuit including, for example, a central processing unit (CPU), a ROM storing a program and the like, and a RAM serving as a work area, and controls the I/F unit 150 and the data retaining unit 152 by way of a system bus 156. In the present embodiment, the central control unit 154 also functions as a luminance obtaining unit 160, a position information obtaining unit 162, a specific object provisional determining unit 164, a target portion grouping unit 166, a representative distance deriving unit 168, a target object grouping unit 170, a specific object determining unit 172, and a pattern matching unit 174.

The luminance obtaining unit 160 obtains luminances in units of target portions (pixels) (luminances of three color phases (red, green, and blue) in units of pixels) from the received luminance image 124 according to a control instruction, of the specific object provisional determining unit 164 explained later. At this time, when it is, for example, rainy or cloudy in the detection area, the luminance obtaining unit 160 may obtain the luminances after adjusting a white balance so as to obtain the original luminances.

The position information obtaining unit 162 uses the stereo method to convert parallax information for each block in the detection area 122 of the distance image 126 into three-dimensional position information including a horizontal distance x, a height y from the road surface, and a relative distance z from the subject vehicle 1 according to a control instruction of the representative distance deriving unit 168 explained later. The parallax information represents a parallax of each target portion in the distance image 126, whereas the three-dimensional position information represents information about the relative distance of each target portion in the real space. Accordingly, a term such as the horizontal distance, the height and the relative distance refers to a length in the real space, whereas a term such as a detected distance refers to a distance in the distance image 126. When the parallax information is not derived in units of pixels but is derived in units of blocks, that is, in units of a plurality of pixels, a calculation may be executed in units of pixels with the parallax information being deemed as parallax information about all the pixels which belong to a block.

Figure 5:
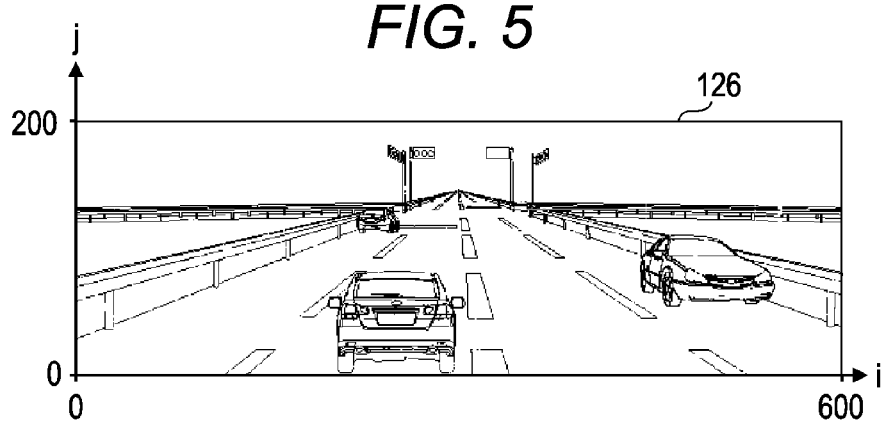
FIG. 5 an explanatory diagram for explaining conversion into three-dimensional position information performed by a position information obtaining unit.

FIG. 5 is an explanatory diagram for explaining conversion into three-dimensional position information by the position information obtaining unit 162. First, the position information obtaining unit 162 treats the distance image 126 as a coordinate system in units of pixels as shown in FIG. 5. In FIG. 5, the lower left corner is adopted as an origin (0, 0). The horizontal direction is adopted as an i coordinate axis, and the vertical direction is adopted as a j coordinate axis. Therefore, a pixel having a parallax do can be represented as (i, j, dp) using a pixel position i and the parallax dp.

The three-dimensional coordinate system in the real space according to the present embodiment will be considered using a relative coordinate system in which the vehicle 1 is located in the center. The right side of the direction in which the vehicle 1 moves is denoted as a positive direction of X axis, the upper side of the vehicle 1 is denoted as a positive direction of Y axis, the direction in which the vehicle 1 moves (front side) is denoted as a positive direction of 2 axis, and the crossing point between the road surface and a vertical line passing through the center of two imaging devices 110 is denoted as an origin (0, 0, 0). When the road is assumed to be a flat plane, the road surface matches the X-Z plane (y=0). The position information obtaining unit 262 uses (formula 1) to (formula 3) shown below to transform the coordinate of the block (i, j, dp) in the distance image 126 into a three-dimensional point (x, y, z) in the real space.

$$x = CD/2 + z \cdot PW \cdot (i - IV) \quad \text{(formula 1)}$$

$$y = CH + z \cdot PW \cdot (j - JV) \quad \text{(formula 2)}$$

$$z = KS/dp \quad \text{(formula 3)}$$

Her CD denotes an interval (baseline length) between the imaging devices 110, PW denotes a viewing angle per pixel, CH denotes an disposed height of the imaging device 110 from the road surface, IV and JV denote coordinates (pixels) in the image at an infinity point in front of the vehicle 1, and KS denotes a distance coefficient (KS=CD/PW).

The specific object provisional determining unit 164 provisionally determines a specific object corresponding to the target object using the luminances of the target object on the basis of the specific object table 200 retained in the data retaining unit 152.

More specifically, the specific object provisional determining unit 164 firstly causes the luminance obtaining unit 160 to obtain the luminances of any given target position in the luminance image 124. Subsequently, the specific object provisional, determining unit 164 sequentially selects any specific object from the specific objects registered in the specific object table 200, and determines whether the luminances of the target portion of the obtained specific object are included in the luminance range 202 of the specific object sequentially selected. Then, when the luminances are determined to be in the target luminance range 202, the target portion is provisionally determined to be the specific object, and an identification number representing the specific object is given to the target portion, and a specific object map is generated.

The specific object provisional determining unit 164 sequentially executes, for each of the plurality of target portions, a series of comparisons between the luminances of the respective target portions and the luminance ranges 202 of the plurality of specific objects registered in the specific object table 200. The order in which the specific objects are selected axe in accordance with the order of priority as shown in the specific object table 200 as explained above. That is, in the example of the specific object table 200 of FIG. 4, the comparison processing is executed in the following order: "traffic light (red)", "traffic light (yellow)", "traffic light (blue)", "tail lamp (red)", "turn signal (orange)", "road sign (red)", "road sign (blue)", and "road sign (green)".

When the comparison is made according to the above order of priority, and as a result, the luminances of the target portion are determined to be included in the luminance range 202 of a specific object of a high order of priority, the comparison processing is no longer performed for specific objects of a lower order of priority. Therefore, one target portion is given only at most one identification number representing one specific object. This is because a plurality of specific objects does not overlap in the space, and thus a target object that is once determined to be any given specific object by the specific object provisional, determining unit 164 is no longer required to be examined to be whether or not it is another specific object. By exclusively treating the target portions in this manner, it is possible to avoid redundant specifying processing for the same target portion of which specific object is already provisionally determined, and the processing load can be reduced.

Figure 6:
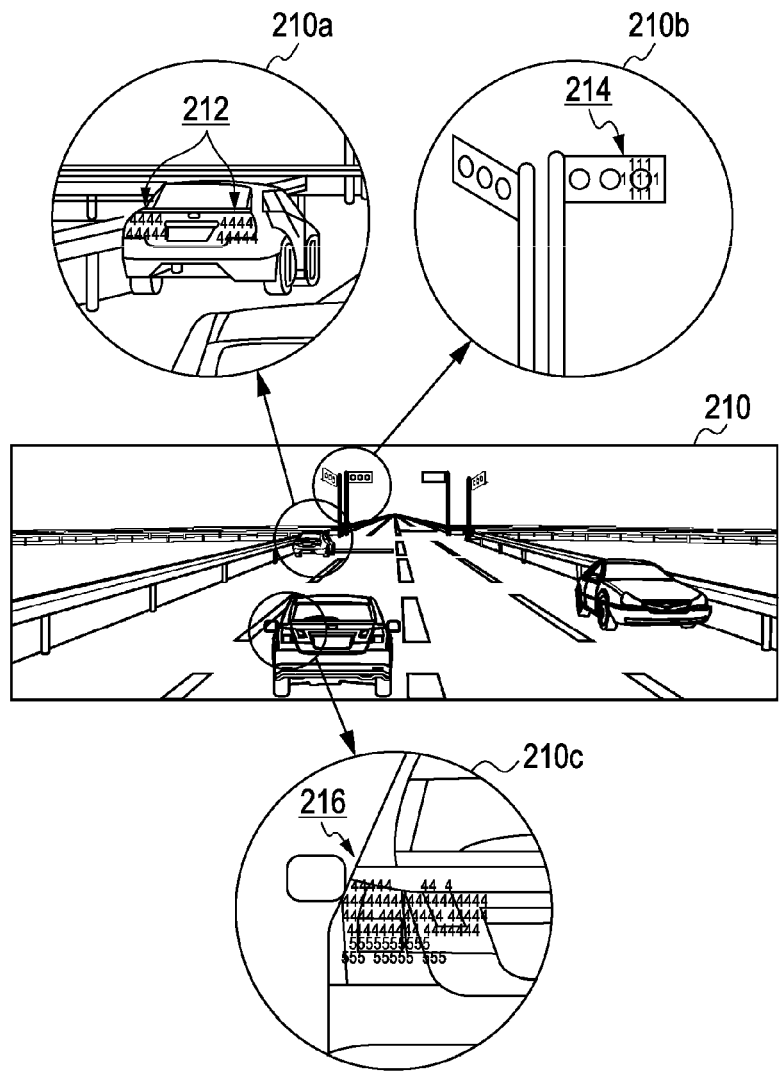
FIG. 6 is an explanatory diagram for explaining a specific object map.

FIG. 6 is an explanatory diagram for explaining ng a specific object map 210. The specific object map 210 is made by overlaying the identification numbers of the specific objects on the luminance image 124, and the identification number of the specific object is associated with a position corresponding to the target portion provisionally determined to be the specific object.

For example, in a partial map 210a of the specific object map 210, the luminances of each of the plurality of target portions 212 corresponding to the tail lamps of the preceding vehicle are compared with the luminance range 202 of the specific objects "traffic light (red)", "traffic light (yellow)", "traffic light (blue)", and "tail lamp (red)" in order. As a result, since the luminances are included in the luminance range 202 of the specific object "tail lamp (red)", an identification number "4" of the specific object "tail, lamp (red)" is associated therewith. In a partial map 210b of the specific object map 210, the luminances of each of the plurality of target portions 214 corresponding to the light-emitting portions at the right side of the traffic light are included in the luminance range 202 of the specific object "traffic light (red)", and therefore, an identification number "1" of the specific object "traffic light (red)" is associated therewith. Further, in a partial map 220c of the specific object map 220, the luminances of each of the plurality of target portions 216 corresponding to the back surface lamp portion, of the preceding vehicle are compared with the luminance range 202 of each of the specific objects "traffic light (red)", "traffic light (yellow)", and "traffic light (blue)" in order, and eventually, an identification number "4" of the specific object "tail lamp (red)" and an identification number "5" of the specific object "turn signal (orange)" are associated therewith. FIG. 6 shows a figure in which identification numbers are given to a plurality of target portions of the luminance image 124. This is, however, a conceptual representation for the sake of easy understanding. In reality, identification numbers are registered as data at target portions.

The target portion grouping unit 166 adopts any given target portion provisionally determined as a base point, and groups target portions that are adjacent to the target portion in the luminance image 124 and provisionally determined to correspond to a same specific object (attached with a same identification number), thereby making the grouped target portions into a target object. The grouping is performed by, for example, extracting, from the multiple target portions, a target portion of which horizontal distance x is the leftmost (xl), a target portion of which distance x is the rightmost (xr), a target portion of which height v is the minimum (ymin), and a target portion of which height y is the maximum (ymax), and enclosing the multiple target portions with a rectangle having four lines, that are x=xl, x=xr, y=ymin, and y=ymax. Therefore, the number of target portions constituting the grouped target, object is equal to or more than the number of target portions serving as the basis of the grouping.

The target portion grouping unit 166 also groups target portions that are newly added by the grouping processing. In this case, the grouping unit 166 adopts the grouped target portion as a base point, and groups the target portions which belong to a same specific object. Consequently, as long as distances between target portions provisionally determined to be the same specific object are adjacent to each other, all of such target portions are grouped.

Figure 7A:
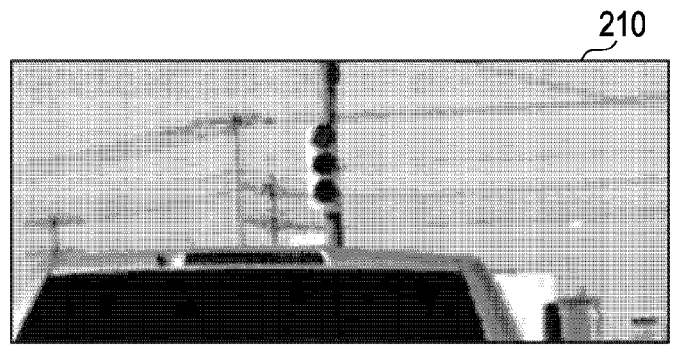
FIGS. 7A to 7D are explanatory diagrams for explaining processing of a target portion grouping unit.
Figure 7B:
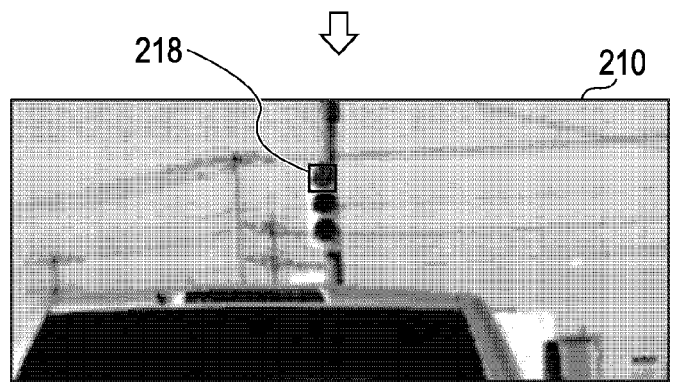

FIGS. 7A to 7D and 8A to 8C are explanatory diagrams for explaining processing of the target portion grouping unit 166. In the drawings, identification numbers are omitted for the purpose of easy understanding. For example, the target portion grouping unit 166 groups adjacent target portions that are provisionally determined to correspond to the specific object "traffic light (red)" with respect to the identified object map 210 as illustrated in FIG. 7A, and the target portion grouping unit 166 produces a target object 218 as illustrated in FIG. 7B. As a result, the specific object "traffic light (red)" is extracted.

Figure 7C:
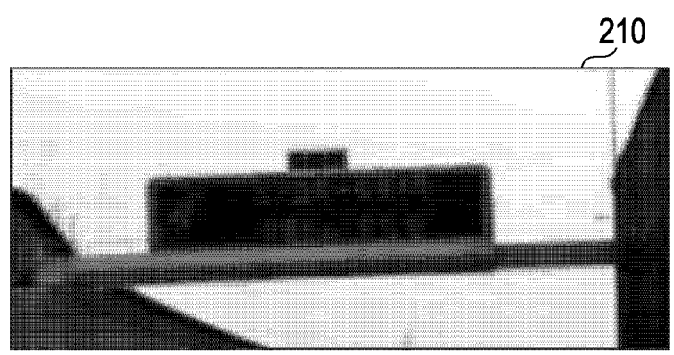
Figure 7D:
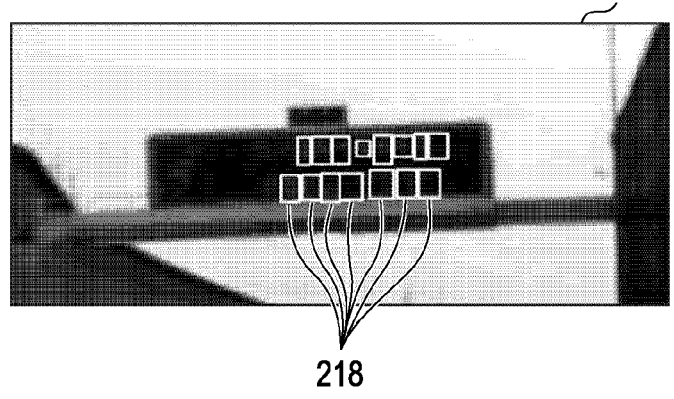
Figure 8A:
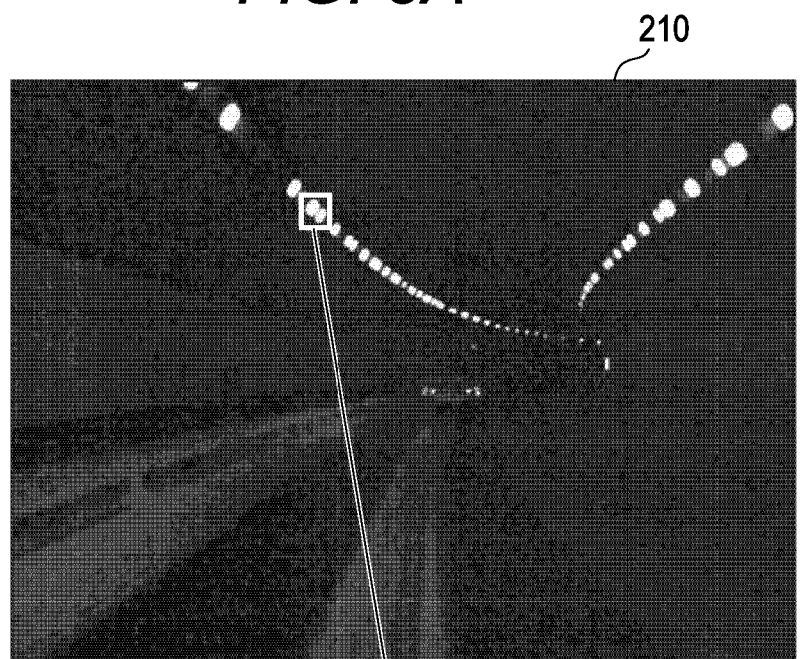
FIGS. 8A to 8C are explanatory diagrams for explaining processing of the target portion grouping unit.
Figure 8B:
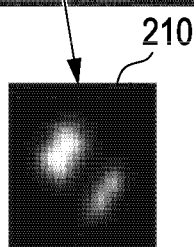
Figure 8C:
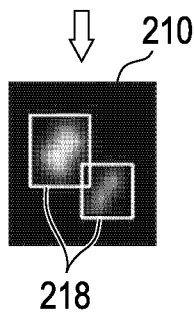

Likewise, when characters with an emitting color of "red" are displayed in an light, emitting traffic sign are as illustrated in FIG. 7C, the target portion grouping unit 166 groups the target portions in each character to derive target objects 218 as illustrated in FIG. 7D. Hereinafter a device, such as the light-emitting traffic sign, that provides information accompanied by light emission is simply referred to as an "indicator". When the subject vehicle 1 is running in a tunnel as shown in FIG. 8A lights illuminate in red as shown in FIG. 8B that is a figure enlarging and showing a white frame portion of FIG. 8A, the target portion grouping unit 166 groups target portions for each light-emitting portion to derive target 218, as shown in FIG. 8C.

Now, when, as shown in FIG. 7D, the sizes of the target objects 218 obtained by grouping the characters are similar to that of the specific object "traffic light (red)", such characters may be eventually recognized falsely as the specific object "traffic light (red)"

Here, the traffic light in FIG. 7A and the indicator in FIG. 7C are different as follows: in the traffic light, a light emitting portion does not have a neighboring light emitting portion with a same emission color. In the indicator, on the other hand, a light emitting portion is likely to have a neighboring light emitting portion with a same emission color. Thus, when a light emitting portion (target object) has a neighboring target portion (or target object) that is provisionally determined to belong to a same specific object as the light, emitting portion (target object), they are further grouped into one target object. As a result, an target object such as the indicator, which displays same light emitting portions with a same color on a same surface can be determined, as one target object. The representative distance deriving unit 168 and the target object grouping unit 170, which are used to implement such grouping, will be described below.

The representative distance deriving unit 168 derives a representative distance that is a representative value of a relative distance z of target portions in the target object grouped by the target portion grouping unit 166. The representative distance may be obtained by optionally selecting plural target portions from the grouped target object and obtaining an average value of the relative distance thereof. In the embodiment, however, a relative distance having a high appearance frequency is used as the representative distance. Specifically, the representative distance deriving unit 168 divides a predetermined distance range into plural divided distance ranges, specifies a divided distance range which includes the relative distance z of each target portion in the target object, and adds 1 to the divided distance range including the relative distance z. When all of the relative distances z of the target portions in the target object, a histogram indicating a distance distribution of the target object is generated. The representative distance deriving unit 168 derives the relative distance corresponding to a peak of the added distance distribution (histogram) as the representative distance. As used herein, "corresponding to the peak" means a peak value or a value that satisfies any condition near the peak.

Note that the representative distance may be derived by various procedures other than the above procedure using the peak of the distance distribution. For example, an average value, a maximum value, or a minimum value of the relative distance z of the target portions in the target object. The representative distance needs only to identify one schematic relative distance of the target object.

The target object grouping unit 170 determines whether or not target portion in which a difference of a horizontal distance x and a difference of a height y from the target object serving as the base point fall within a first predetermined range and a difference between the relative distance z and the representative distance fails within a second predetermined range corresponds to a same specific object with respect to the target object serving as the base point and the luminance. The first predetermined range and the second predetermined range may be set to, for example, 1.0 m in the real space. When there is a target portion corresponding to the same specific object as the target object, the target object grouping unit 170 also groups the target portion into the target object. In the real space, even when target portions have a similar horizontal distance x and a similar height y, the relative distance z thereof may be greatly different in such case, the target portions belong to different target objects. Therefore, when any one of the horizontal distance x, the height y, and the relative distance z is greatly different, the group of the target portions may be deemed as an independent, target object. In so doing, it is possible to perform highly accurate grouping processing.

In the above processing, the target object grouping unit 170 groups plural target portions into a target object only when the plural target portions within the first predetermined range and the second predetermined range are adjacent to each other, and the number of target portions is equal to or more than a predetermined number (for example, 5). For example, when the plural target portions within the first predetermined, range and the second predetermined range are adjacent to each other, and there are a reasonable number of such target portions, the group of the target portions may be regarded as a part of an actually-existing target object. In so doing, it is possible to exclude a target portion that is generated as a noise and corresponds to the same specific object as the target object, whereby the grouping can properly be performed.

The target object grouping unit 170 regards the relative distance z of the target portions grouped into the target object as the representative distance, and further groups another target portion satisfying the condition into the target object with the target portion as the base point.

Figure 9A:
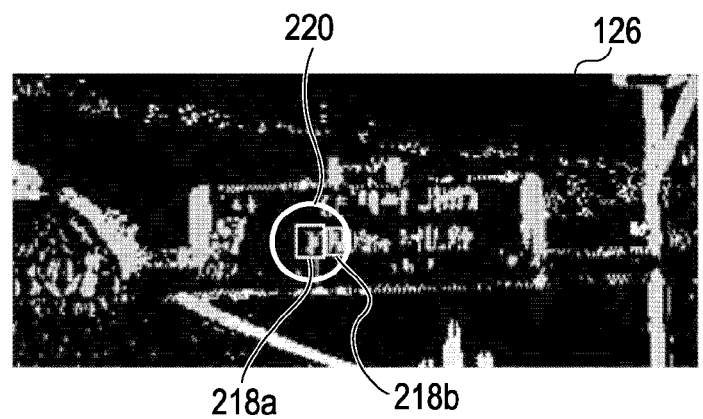
FIGS. 9A to 9C are explanatory diagrams for explaining processing of a target object grouping unit.
Figure 9B:
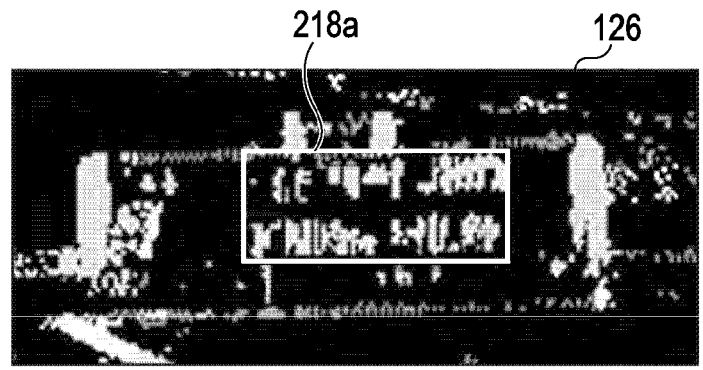
Figure 9C:
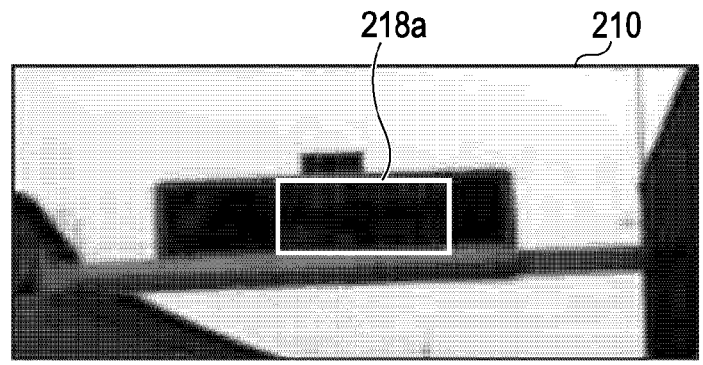

FIGS. 9A to 9C are explanatory diagrams for explaining processing of the target object grouping unit 170. FIG. 9A and FIG. 9B are a distance image 126 corresponding to the specific object map 210 in FIG. 7D, and FIG. 8C illustrates the specific object map 210 generated in the same manner as FIG. 7D. As illustrated in FIG. 9A, with the target object 218a located on the lower left of the image as the base point, the target object grouping unit 170 searches for a target portion within a first predetermined range 220 and the second predetermined range that corresponds to a same specific object as the target object, from the center (barycenter) position of the target object 218a. In the drawing, a target object 218b corresponds to a same specific object as a target object 218a, and the number of adjacent target portions is equal to or more than the predetermined, number. Therefore, the target object 218b is grouped into the target object 218a.

Then the target object grouping unit 170 regards the relative distance z of the target portion (target object 218b) grouped into the target object 218a as the representative distance, and further groups another target portion satisfying the condition into the target object 218a with the target portion as the base point. The condition is that the target portion falls within the first predetermined range and the second predetermined range and corresponds to the same specific object as the target object 218a. Thus, target objects (target portions) in which the distances are similar to each other can be collected into one target object 218a as illustrated in FIG. 8B by sequentially grouping the target portions determined to correspond to a same specific object. Unlike the case in which a wide range is grouped at once, target portions are sequentially grouped, whereby only a target object having high continuity can properly be grouped. In FIG. 8C, the one target object 218a is incorporated into the specific object map 210. Although provisionally determined to be the identified object "traffic light (red)" with respect to the luminance, the target object 218a is not eventually determined to be the specific object "traffic light (red)" because the size of the target object 218a is not less than 0.4 m (see FIG. 4). In this manner, it is possible to avoid the indicator from erroneously being determined to be traffic light.

In this case, the target object grouping unit 170 makes the determination using the horizontal distance and the height in the real space, but when a determination is made using the detection distances in the luminance image 124 and the distance image 126, the threshold value of the first predetermined range for grouping is changed according to the relative distance of the target portion. As shown in FIG. 2 and the like, distant objects and close objects are represented in the flat plane in the luminance image 124 and the distance image 126, and therefore, an object located at a distant position is represented in a small (short) size and an object located at a close position is represented in a large (long) size. Therefore, for example, the threshold value of the predetermined range in the luminance image 124 and the distance image 126 is set at a small value for a distant target portion, and set at a large value for a close target portion. Therefore, even when the detection distances are different between a distant position and a close position, the grouping processing can be stably performed. In the case in which the determination is made based on the detection distance on the distance image 126, the first predetermined range may be defined by the number of pixels. For example, (adjacent) pixels having a gap of one pixel therebetween in the horizontal direction or the vertical direction may be grouped.

In the above description, each of the difference of the horizontal distance x, the difference of the height v, and the difference of the relative distance z is independently determined, and only when all of them are included within the predetermined range, the target portions are grouped into a same group. However, grouping processing may be performed using another calculation. For example, when a square mean value √ of the difference of the horizontal distance x, the difference of the height v, and the difference of the relative distance z ((difference of horizontal distance x)2+(difference of height y)2+(difference of relative distance z)2) is included within a third predetermined range, target portions may be grouped into a same group. With such calculation, the distance between the target object and another target portion in the real space can be derived accurately, and therefore, grouping accuracy can be enhanced.

However, since the target object grouping unit 170 uniformly performs the grouping processing of the target object, small light-emitting objects may be unified against the intention as a result of such grouping, whereby a specific object that is not originally desired to be recognized may be falsely recognized as a specific object.

Figure 10A:
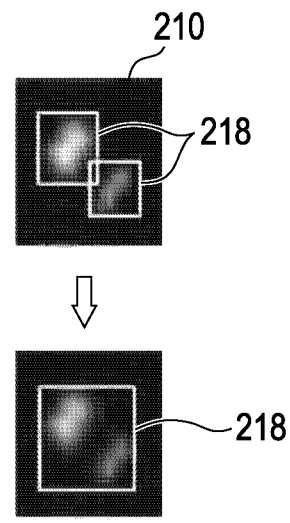
FIGS. 10A and 10B are other explanatory diagrams for explaining processing of the target object grouping unit.
Figure 10B:
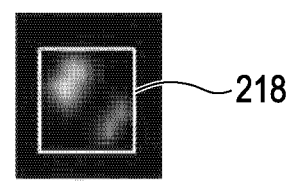

FIGS. 10A and 10B are other explanatory diagrams for explaining processing of the target object grouping unit 170. When, for example, an attempt is made to extract the specific object "traffic light (red)" as described above, the target portion grouping unit 166 performs grouping for each of multiple lights installed in a tunnel with a narrow interval as shown in FIG. 10A to generate multiple target objects 218. Therefore, when this state is maintained, the size of the target objects is not included in the width range 204 of the specific object "traffic light (red)", and eventually, the target objects are not determined to be the specific object "traffic light (red)".

However, since the subject, grouping unit 170 uniformly performs the grouping processing on the entire luminance image 124, it is impossible to exclude only a particular target object from the grouping targets. Therefore, as shown in FIG. 10A, when multiple target objects 218 are located closely in the image, the target object grouping unit 170 groups the multiple target objects 218 as shown in FIG. 10B. As a result, the lights in the tunnel, which, if not grouped, should be originally recognized to be smaller than the light-emitting portion of a traffic light, appears to have a size closer to the size of the traffic light due to the unification whereby the grouped multiple lights are falsely recognized as a traffic light.

This is not limited to the target object grouping unit 170. When multiple light sources in an image are detected in a partially overlapping state, the multiple light sources are recognized as one light source, which also has almost, the same size as the traffic light, and may be falsely recognized as the traffic light. For example, when multiple light sources located at a distance are accommodated within several pixels of the image, the multiple light sources may be recognized as one target object.

Here, the light-emitting portion of the traffic light of FIG. 7B and the grouped illuminations in FIG. 10B are different as follows: the light-emitting portion of the traffic light includes only one light source, whereas the grouped lights include multiple light sources. Accordingly, the overall luminances of the traffic light are high among the target object. On the other hand, the luminances of the grouped lights are partially high, and an area where the luminances are high is not uniform, whereby the overall luminances of the grouped lights are lower than those of the traffic light. Accordingly, in the present embodiment, in order to improve the accuracy of specifying a target object, a determination is made as to whether there is only one light source or there are multiple light sources in a target object. The specific object determining unit 172 for achieving such determination will be hereinafter explained.

First, the specific object determining unit 272 determines whether or not the luminances of each target portion in a specific region in the grouped target object 218 is included in the predetermined luminance range for a specific object. Then, a ratio of targets portions whose luminances are included in the predetermined luminance range with respect to all of the target portions in the specific region is derived, and a determination is made as to whether the ratio is equal to or more than a predetermined, threshold value. When the ratio of target portions whose luminances are included in the predetermined luminance range is equal to or more than the predetermined threshold value and a predetermined, condition is satisfied, the target object is determined as the specific object. The luminance range 202 as shown in the specific object table 200 of FIG. 4 may be used as the luminance range as it is, or the luminance range may be set independently in the luminance object determining unit 172. The luminance range may be changed according to an exposure time and a dynamic range. The predetermined threshold value may be set at any numerical, value, and in this description, the predetermined threshold value is set to approximately 60%. The predetermined threshold value may be changed according to a color restoration technique and a lens' resolution.

The specific region may be set to any region therein that is smaller than the target object using a ratio with the target object or a positional relationship. In the present embodiment, an explanation will, be made when the specific region is either one of or both of a belt-like region extending in the horizontal direction passing through the center of the vertical direction of an image of a target object and a belt-like region extending in the vertical direction passing through the center of the horizontal direction of the image of the target object.

Figure 11A:
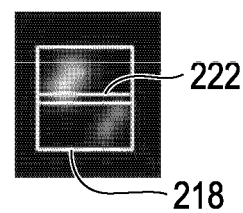
FIGS. 11A to 11C are explanatory diagrams for explaining processing of a specific object determining unit.
Figure 11B:
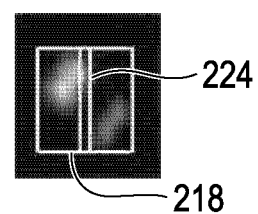
Figure 11C:
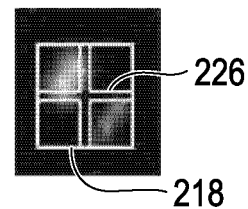

FIGS. 11A to 11C are explanatory diagrams for explaining processing of the target object determining unit 172. Specifically, FIG. 11A shows a case where the specific region is a belt-like region 222 extending in the horizontal direction passing through the center of the vertical direction of an image of a target object. FIG. 11B shows a case where the specific region is a belt-like region 224 extending in the vertical direction passing through the center of the horizontal direction of the image of the target object. FIG. 11C shows a case where the particular region is a cross-like region 226 in which the belt-like region 222 and the belt-like region 224 of FIG. 11A and FIG. 11B, respectively, are overlaid on each other.

Referring to the luminances of a target portions included in the belt-like region 222 in FIG. 11A, there is a target portion having luminances included in the luminance range of the specific object "traffic light (red)", but the ratio of such target portion is less than 60% of the entire belt-like region 222. Luminance peak values appear at multiple positions, and they tend to deviate from the center to sides.

Like the belt-like region 222, the belt-like region 224 s shown in FIG. 11B and the cross-like region 226 shown in FIG. 11C each have a target portion having luminances included in the luminance range of the specific object "traffic light (red)", the ratio of such target portion is less than 60% of the entire region.

In FIGS. 11A to 11C explained above, two (an even number of) light sources are grouped, as an example. Therefore, the luminances of a target portion at the center of the target portion are less likely to be included in the luminance range of the specific object "traffic light (red)" On the other hand, when there are an odd number of light sources (such as three light sources), the luminances of the target portion at the center of the subject is more likely to have luminances included in the luminance range of the specific object "traffic light (red)". However, in the belt-like regions 222 and 224 and the cross-like region 226 explained above, areas with high luminances are nondense, and accordingly, the rates thereof are less than 60% of the belt-like regions 222 and 224 and the cross-like region 226.

Therefore, the specific object determining unit 172 extracts the luminances of each target portion of the specific region such as the belt-like regions 222 and 224 and the cross-like region 226, and determines whether or not the respective luminances are included in the luminance range of a specific object. Then, when the ratio at which the luminances are included, in the luminance range of the specific object is equal to or more than the predetermined, threshold value, the target object 218 is determined to be constituted by one light source, and specified as, for example, the specific object "traffic light (red)" in this case, the target object 218 of which ratio of the luminances included in the luminance range of a specific object is less than the predetermined threshold value is not determined to be the specific object "traffic light (red)", and therefore, it is determined whether or not the target object 218 is another specific object in subsequent processing.

In the above explanation, the belt-like regions 222 and 224 are extended from one end portion of the target object 218 to the other end portion as an example. However, the length is not limited to the length from one end portion to the other end portion, and may be optionally set shorter.

Subsequently, when the ratio of target portions of which luminances re included in the predetermined luminance range is equal to or more than the predetermined threshold value, the specific object determining unit 172 determines whether a predetermined condition is satisfied or not, and when the predetermined condition is satisfied, the target object is determined to be a specific object. For example, as shown in FIG. 4, when the width range 204 is associated with the specific object table 200, and the size of a target object (both the horizontal distance x and the height y of the target object) is included in the width range 204 of a specific object provisionally determined with regard to the target object on the basis of the specific object table 200, the specific object determining unit 174 determines the target object as the specific object. A separate width range 204 may be set for each of the horizontal distance x and the height y. Here, it is examined whether the target object is of a size adequate to be deemed as a specific object. Therefore, when the size of the target object is not included in the width range 204, the target object can be excluded as information unnecessary for the environment recognition processing. For example, in the examples of FIGS. 7 and 9, the size of the target object 218 in FIG. 7B is included in the width range of "0.2 m to 0.4 m" of the specific object "traffic light (red)", and thus the target object 218 is properly specified as the specific object "traffic light (red)". On the other hand, the size of the target object 218a in FIG. 9C is not included in the width range of "0.2 m to 0.4 m" of the specific object "traffic light (red)", the target object 218a is not specified as the specific object "traffic light (red)". Before the size of the target object 218 in FIG. 10B is determined, the target object 218 is excluded as a result of the determination using the belt-like regions 222 and 224 and the cross-like region 226, and therefore, naturally, it is not specified as the specific object "traffic light (red)".

As a result, the environment recognition device 130 can extract, from the luminance image 124, one or more target objects as specific objects, an the information can be used for various kinds of control. For example, when the specific object "traffic light (red)" is extracted, this indicates that the target object is a fixed object that does not move, and when the target object is a traffic light for the lane of the subject vehicle 1, this indicates that the subject vehicle 1 has to stop or decelerate. When the specific object "tail lamp (red)" is extracted, this indicates that there is a preceding vehicle travelling together with the subject vehicle 1 and that the back surface of the preceding vehicle is at the relative distance of the specific object "tail lamp (red)".

When a specific object determined by the specific object determining unit 172 is, for example, a "sign" and it is assumed that the specific object indicates a speed limit, the pattern matching unit 174 further executes pattern matching for a numerical value indicated therein, and specifies the numerical value. In this manner, the environment recognition device 130 can recognize the speed limit and the like of the traffic lane in which the subject vehicle is travelling.

In the present embodiment, the specific object determining unit 172 first extracts a plurality of limited specific objects, and then only has to perform the pattern matching only on the extracted specific objects. Therefore, in contrast to the conventional case where pattern matching is performed on the entire surface of the luminance image 124, the processing load is significantly reduced.

(Environment Recognition Method)

Figure 12:
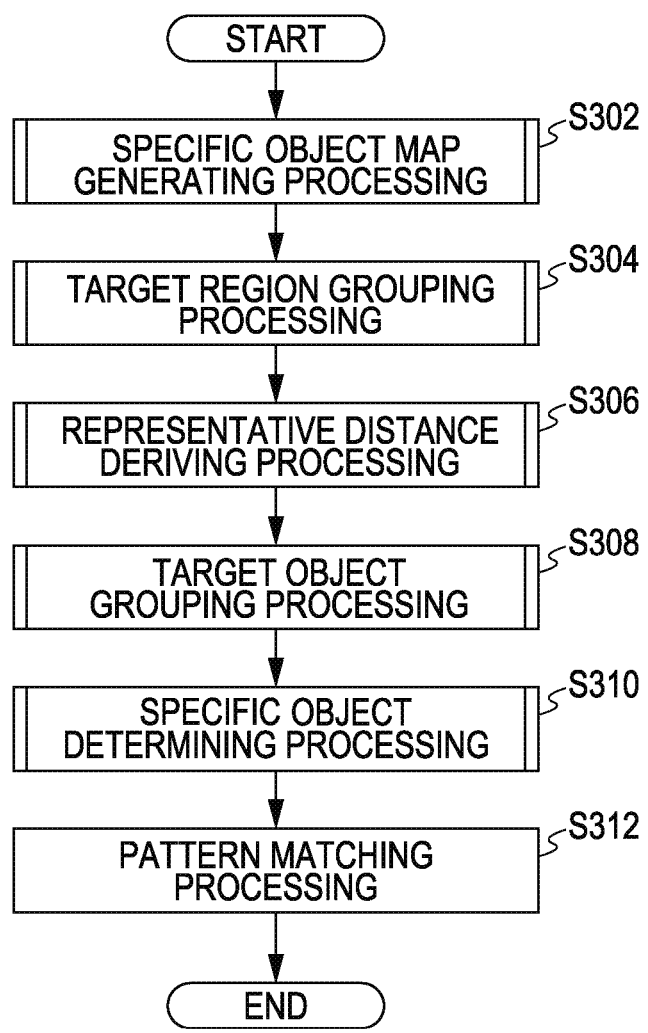
FIG. 12 is a flowchart illustrating an overall flow of the environment recognition method.

Hereinafter, specific processing performed by the environment recognition device 130 will be explained based on the flowchart shown in FIGS. 12 to 17. FIG. 12 illustrates an overall flow of interrupt processing when the image processing device 120 transmits the distance image (parallax information) 126. FIGS. 13 to 17 illustrate subroutines therein. In this description, pixels are used as target portions, and the lower left corners of the luminance image 124 and the distance image 126 are origins. The processing is performed according to the environment recognition method in a range of 1 to 600 pixels in the horizontal direction of the image and 1 to 200 pixels in the vertical direction of the image. In this description, the number of specific objects to be checked is assumed to be eight.

As shown in FIG. 12, it is assumed that when an interrupt occurs according to the environment recognition method in response to reception of the distance image 126, the specific object "traffic light (red)" is extracted. Subsequently, the luminance image 124 obtained from the image processing device 120 is referred to, and a specific, object map 210 is generated (S302).

Subsequently, the specific objects provisionally determined are made into a group (S304), the representative distance of the grouped specific objects is derived (S306), target portions near the specific objects are further incorporated into the grouped specific objects by grouping (S308), and the grouped target objects are determined as a specific object (S310). If it is necessary to further obtain information from the specific object thus determined, the pattern matching unit 174 executes the pattern matching on the specific object (S312). Hereinafter, the above processing will, be explained more specifically.

(Specific Object Map Generating Processing S302)

Figure 13:
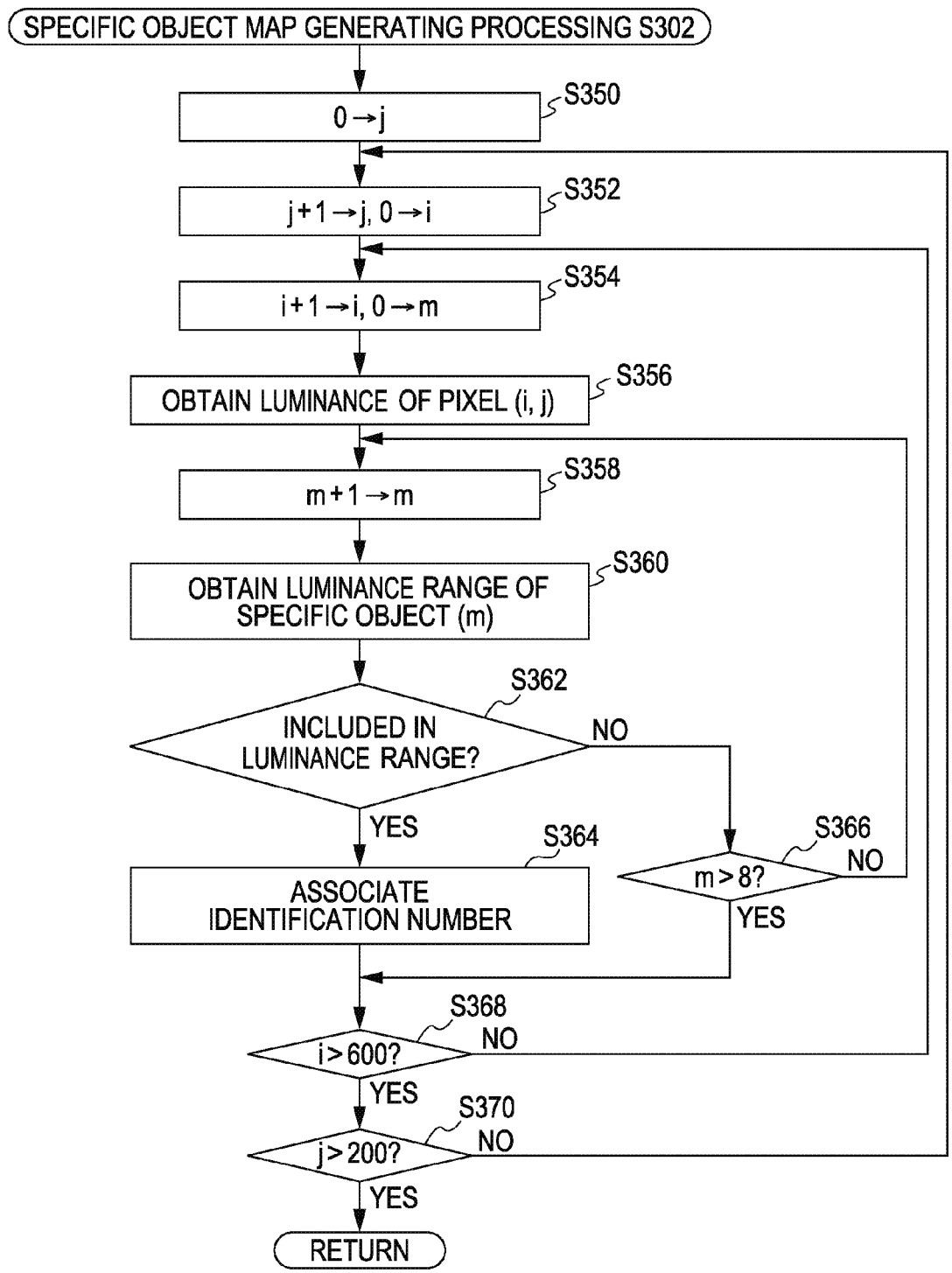
FIG. 13 is a flowchart illustrating a flow of specific object map generating processing.

As shown in FIG. 13, the specific object provisional determining unit 164 initializes (substitutes "0" to) a vertical variable j for specifying a target portion (pixel) (S350). Subsequently, the specific object provisional, determining unit 164 adds "1" to (increments by 1) the vertical variable j, and initializes (substitutes "0" to) a horizontal variable i (S352). Then, the specific object provisional, determining unit 164 adds "1" to the horizontal variable i, and initializes (substitutes "0" to) a specific object variable m (S354). Here, the horizontal variable i and the vertical variable j are provided to execute the specific object map generating processing on all of the 600×200 pixels, and the specific object variable m is provided to sequentially compare eight specific objects for each pixel.

The specific object provisional determining unit 164 causes the luminance obtaining unit 160 to obtain luminances of a pixel (i, j) as a target portion from the luminance image 124 (S356), adds "1" to the specific object variable m (S358), obtains the luminance range 202 of the specific object (m) (S360), and determines whether or not the luminances of the pixel (i, j) are included in the luminance range 202 of the specific object (m) (S362).

When the luminances of the pixel (i, j) are included in the luminance range 202 of the specific object (m) (YES in S362), the specific object provisional determining unit 164 associates an identification number p representing the specific object (m) with the pixel, to newly name the pixel (i, j) a pixel (i, j, p) (S364). In this manner, the specific object map 210 is generated, in which a identification, number is given to each pixel in the luminance image 124. When the luminances of the pixel (i, j) is not included in the luminance range 202 of the specific object (m) (NO in S362), a determination is made as to whether or not the specific object variable ma is more than 8 which is the maximum number of specific objects (S366). When the specific object variable in is not more than the maximum value (NC) in S366), the processings are repeated from the increment processing of the specific object variable m in step S358. When the specific object variable in is equal to or more than the maximum value (YES in S366), which means that there is no specific object corresponding to the pixel (i, j), the processing in step S368 subsequent thereto is performed.

Then, the specific object provisional determining unit 164 determines whether or not the horizontal variable i is more than 600 which is the maximum value of horizontal pixel (S368), and when the horizontal variable is not more than the maximum value (NO in S368), the processings are repeated from the increment processing of the horizontal variable i in step S354. When the horizontal variable i is more than the maximum value (YES in S368), the specific object provisional determining unit 164 determines whether or not the vertical variable j is more than 200 which is the maximum value of vertical, pixel (S370). Then, when the vertical variable j is not more than the maximum value (NO in S370), the processings are repeated from the increment processing of the vertical variable j in step S352. When the vertical variable j is more than the maximum value (YES in S370), the specific object map generating processing is terminated.

(Target Portion Grouping Processing S304)

Figure 14:
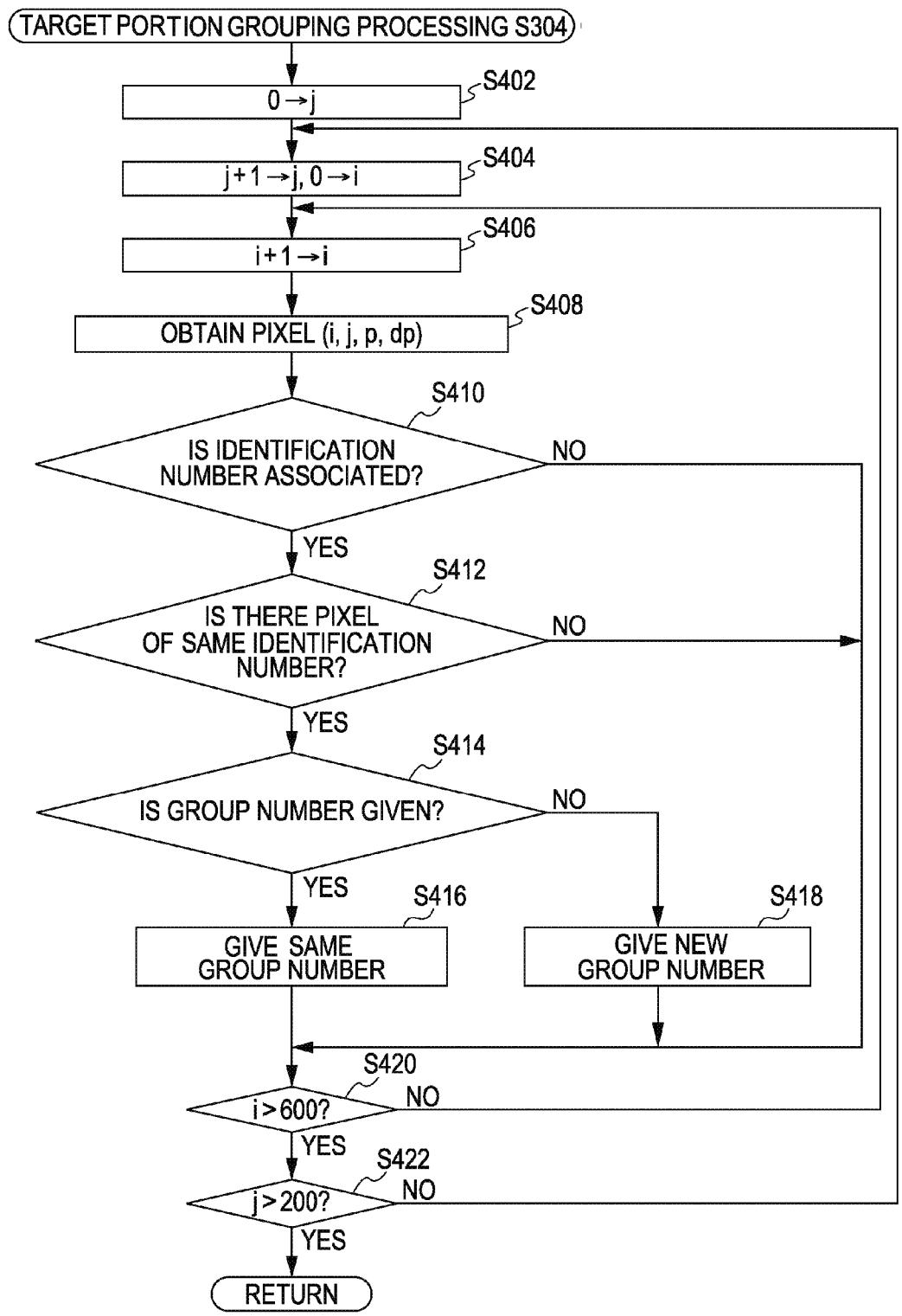
FIG. 14 is a flowchart illustrating a flow of target portion grouping processing.

As shown in FIG. 14, the target portion grouping unit 166 initializes (substitutes "0" to) a vertical variable j for specifying a target portion (pixel) (S402). Subsequently, the target portion grouping unit 166 adds "1" to the vertical variable j, and initializes (substitutes "0" to) a horizontal variable i (S404). Then, the specific object provisional determining unit 164 adds "1" to the horizontal variable i (S406).

The target portion grouping unit 166 obtains a pixel p, dp) as the target portion from the luminance image 124 (S408). Then, a determination is made as to whether an identification number p of the specific object is associated with the pixel (i, j, p, dp) (S460). When the identification number p is associated (i, j, p, dp) (YES in S410), the target portion grouping unit 166 determines whether or not there is another pixel that is adjacent to the pixel (i, j, p, dp) and associated with the same identification number p (S412).

When there is another pixel (i, j, p, dp) associated with the same identification number (YES in S412), the target portion grouping unit 166 determines whether or not a group number g is given to any of all the pixels in the predetermined range including the pixel under determination (S414). When the group number g is given to any of them (YES in S414), the target portion grouping unit 166 gives a value to all of the pixels included in the predetermined range and all of the pixels to which the same group number g is given, the value being the smallest group number g among the group numbers given thereto or the smallest value of numbers that have not yet used as a group number, whichever is smaller to newly name the pixels a pixel (i, j, p, dp, g) (S416). When the group number g is given to none of them (NC) in S414, the smallest value of numbers that have not yet used as a group number is newly given to all the pixels in the predetermined range including the pixel, under determination (S418).

In this manner, when there is a plurality of target portions that have a same identification number in the adjacent pixels, grouping process is performed by giving one group number g. If a group number g is given to none of the plurality of target portions, a new group number g is given, and if a group number g is already given to any one of them, the same group number g is given to the other target portions. However, when there is a plurality of group numbers g in the plurality of target portions, the group numbers g of all, the target portions are replaced with one group number g so as to treat the target portions as one group.

In the above description, the group numbers g of not only all the adjacent pixels but also all the pixels to which the same group number g is given are changed at a time. The primary reason for this is to avoid dividing the group already unified by changing of the group numbers g. In addition, the smallest group number g or the smallest value of numbers that have not yet used as a group number, whichever is smaller, is employed in order to avoid making a skipped number as much as possible upon group numbering. In so doing, the maximum value of the group number g does not become unnecessarily large, and the processing load can be reduced.

When an identification number p is not associated (NO in S410), or when there is no other pixel that has the identification number p (NO in S412), the processing in step S420 subsequent thereto is performed.

Subsequently, the target portion grouping unit 166 determines whether or not the horizontal variable i is more than 600 which is the maximum value of horizontal pixel (S420). When the horizontal variable i is not more than the maximum value (NO in S420), the processings are repeated from the increment processing of the horizontal variable i in step S406. When the horizontal variable i is more than the maximum value (YES in S420), the target portion grouping unit 166 determines whether or not the vertical variable j is more than 200 which is the maximum value of vertical pixel (S422). When the vertical, variable j is not more than the maximum value (NO in S472), the processings are repeated from the increment processing of the vertical variable j in step S404. When the vertical variable j is more than the maximum value (YES in S422), the target portion grouping processing is terminated.

(Representative Distance Deriving Processing S306)

Figure 15:
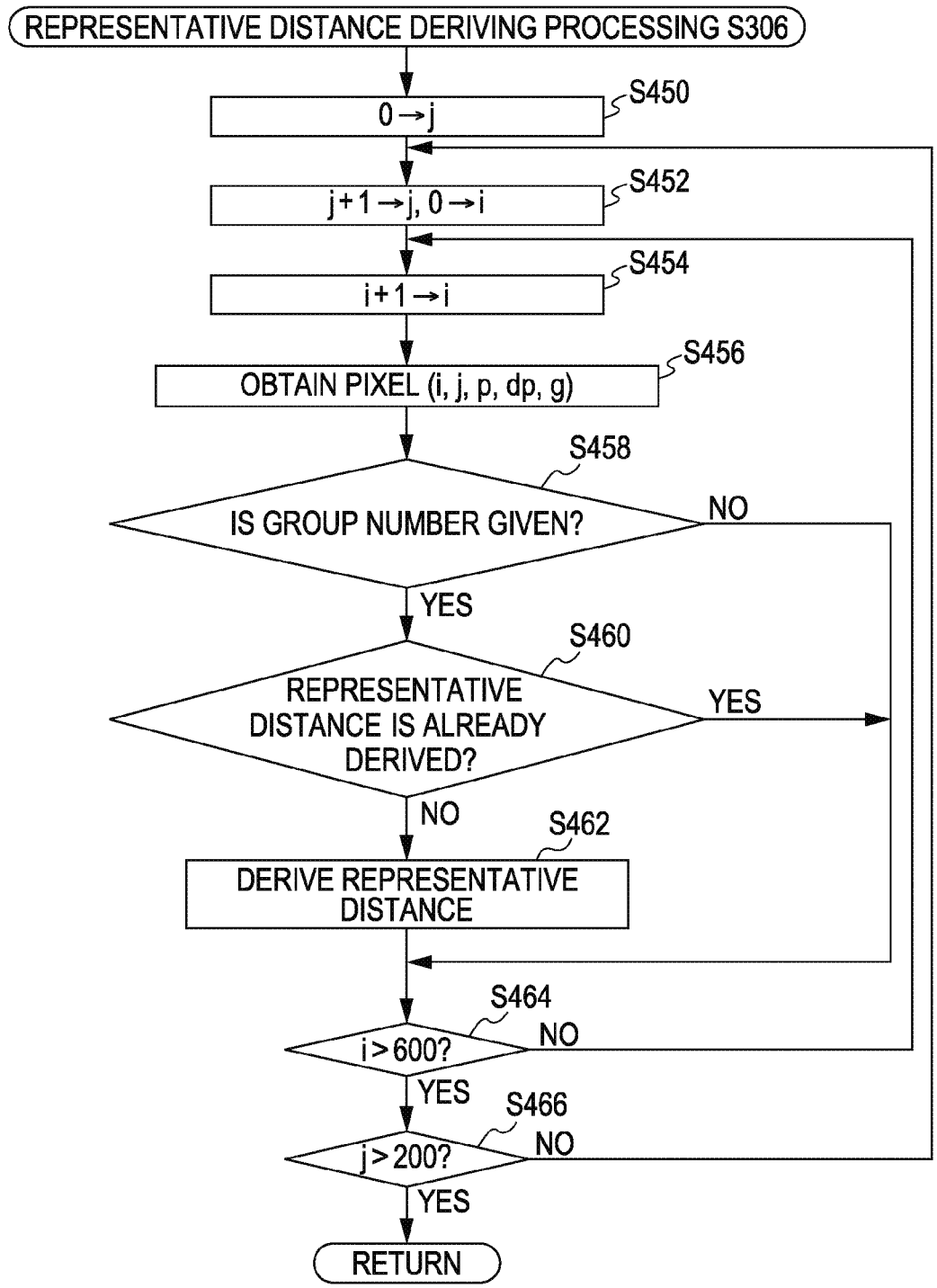
FIG. 15 is a flowchart illustrating a flow of representative distance deriving processing.

As shown in FIG. 15, the representative distance deriving unit 168 initializes (substitutes "0" to) a vertical variable j for specifying a target portion (pixel) (S450). Subsequently, the representative distance deriving unit 168 adds "1" to the vertical variable j, and initializes (substitutes "0" to) a horizontal variable i (S452). Then, the representative distance deriving unit 168 adds "1" to the horizontal variable i (S454).

The representative distance deriving unit 168 obtains a pixel (i, j, p, dp, g) as the target portion from the luminance image 124, transforms the coordinate of the pixel the pixel j, p, dp, g) including the parallax information, dp into a point (x, y, z) in the real space, and newly names the pixel (i, j, p, dp, q) a pixel (i, j, p, dp, g, x, y, z) (S456). Then the representative distance deriving unit 168 determines whether or not the group number g of the pixel (i, j, p, dp, g, x, y, z) is a valid value, namely, whether or not the group number g is already provided (S458). When a valid value is provided as the group number g (YES in 458), the representative distance deriving unit 168 determines whether or not the representative distance of a target object including the pixel (i, j, p, dp, g, x, y, z) is already derived (S460).

When the representative distance of the target object including the pixel is not derived yet (NO in S460), the representative distance deriving unit 168 derives the representative distance, sets a representative distance rd to all the target portions in the target object, and newly names the pixel (i, j, p, dp, g, x, y, z) a pixel (i, j, dp, g, x, y, z, rd) (S462). The representative distance is a relative distance z that corresponds to a peak of the distance distribution of the target portions in the target object. When the group number g is the invalid value (NO in S458), or when the representative distance is already derived (YES in S460), the processing in step S464 subsequent thereto is performed.

Subsequently, the representative distance deriving unit 168 determines whether or not the horizontal variable i is more than 600 which is the maximum value of horizontal pixel (S464), and when the horizontal variable is not more than the maximum value (NO in S464), the processings are repeated from the increment processing of the horizontal variable i in step S454. When the horizontal variable i is more than the maximum value (YES in S464), the specific object provisional determining unit 164 determines whether the vertical variable j is more than 200 which is the maximum value of vertical pixel (S466). Then, when the vertical variable j is not more than the maximum value (NO in S466), the processings are repeated from the increment processing of the vertical variable j in step S402. When the vertical variable j is more than the maximum value (YES in S466), the representative distance deriving processing is terminated.

(Target Object Grouping Processing S308)

Figure 16:
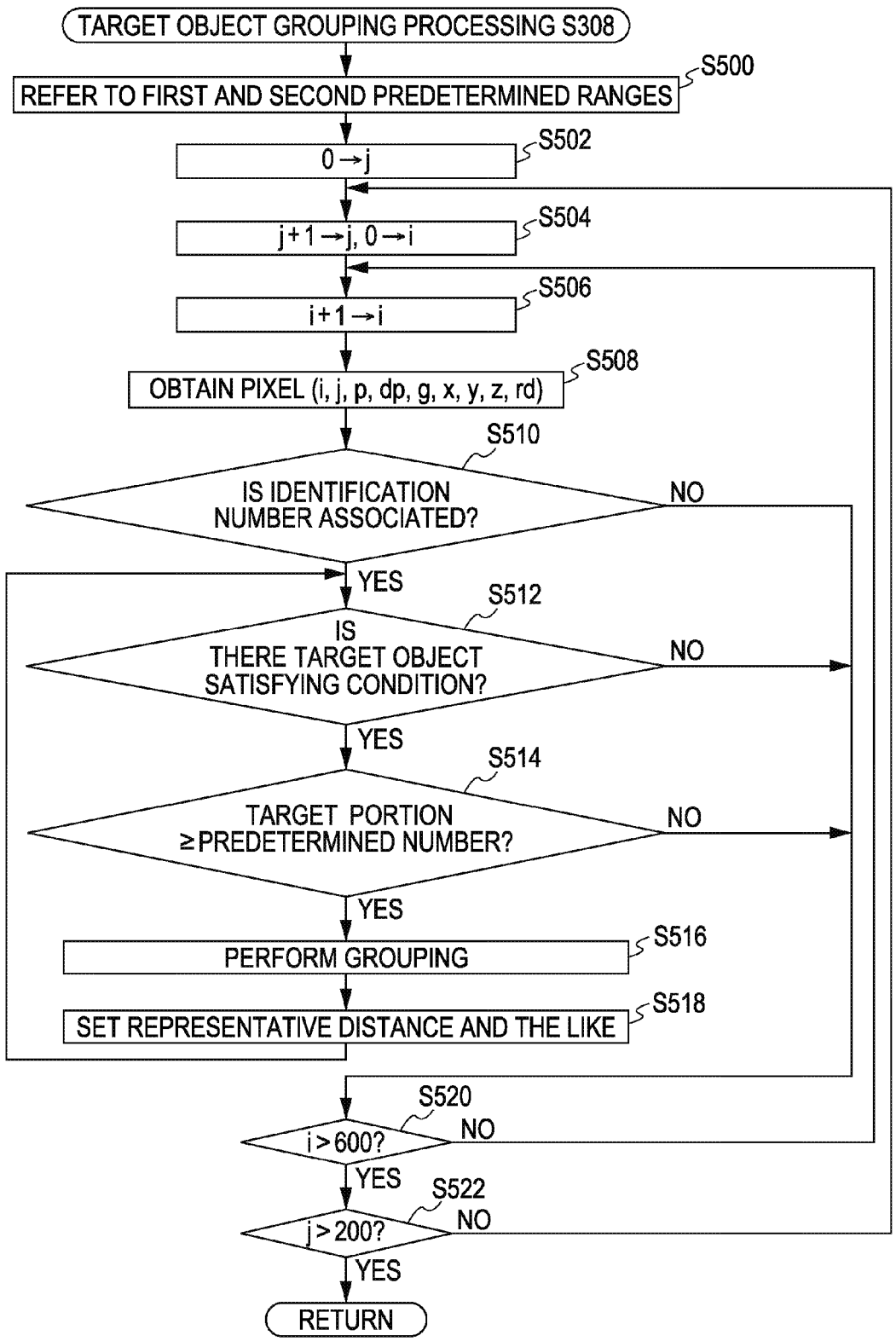
FIG. 16 is a flowchart illustrating a flow of target object grouping processing.

As shown in FIG. 16, the target object grouping unit 170 refers to the first and second predetermined ranges to group target portions (S500), and initializes (substitutes "0" to) the vertical variable j for specifying a target portion (pixel) (S502). Subsequently, the grouping unit 166 adds "1" to the vertical variable j, and initializes (substitutes "0" to) the horizontal variable i (S504). Then, the grouping unit 166 adds "1" to the horizontal variable i (S506).

The target object grouping unit 170 obtains a pixel (i, j, p, dp, g, x, y, z, rd) as the target portion, from the luminance image 124 (S508). Then, a determination is made as to whether an identification number p of the specific object is associated with the pixel (i, j, p, dp, g, x, y, z, rd) (S510). When the identification number p is associated (YES in S510), the target object grouping unit 170 determines whether or not there is another pixel associated with the same identification number p in a the first and second predetermined ranges from the coordinate (x, y, z) in the real space of the pixel (S512).

When there is another pixel (i, j, p, dp, g, x, y, z, rd) associated with the same identification number p (YES in S512), the target object grouping unit 170 determines whether or not the number of target portions in the target object including another pixel is equal to or more than a predetermined number (S514). When the number of target portions in the target object is equal to or more than the predetermined number (YES in S514), the target object grouping unit 170 groups all the target objects including the another pixel along with the target object, and substitutes the group number of the target object including the another pixel for the group number of the grouped target objects (S516). The target object grouping unit 170 adds the representative distance of the target objects including the another pixel as the representative distance, and repeats the processings from the condition determination processing in step 3512 (S518). In so doing, a neighboring target object is searched for not only the target object serving as the base point but also the grouped target object.

When an identification number p is not associated (NC) in S510), when there is no target object satisfying the conditions (NO in S512), or when the number of target portions is less than the predetermined number (NO in S514), the processing in step S520 subsequent thereto is performed.

Subsequently, the target object grouping unit 170 determines whether or not the horizontal variable i is more than 600 which is the maximum value of horizontal pixel (S520). When the horizontal variable i is not more than the maximum value (NO in S520), the processings are repeated from the increment processing of the horizontal variable i in step S506. When the horizontal variable i is more than the maximum value (YES in S520), the grouping unit 166 determines whether or not the vertical variable j is more than 200 which is the maximum value of vertical pixel (S522). When the vertical, variable j is not more than the maximum value (NC) in S522), the processings are repeated from the increment processing of the vertical variable j in step S504. When the vertical variable i is more than the maximum value (YES in S522), the target object grouping processing is terminated.

(Specific Object Determining Processing S310)

Figure 17:
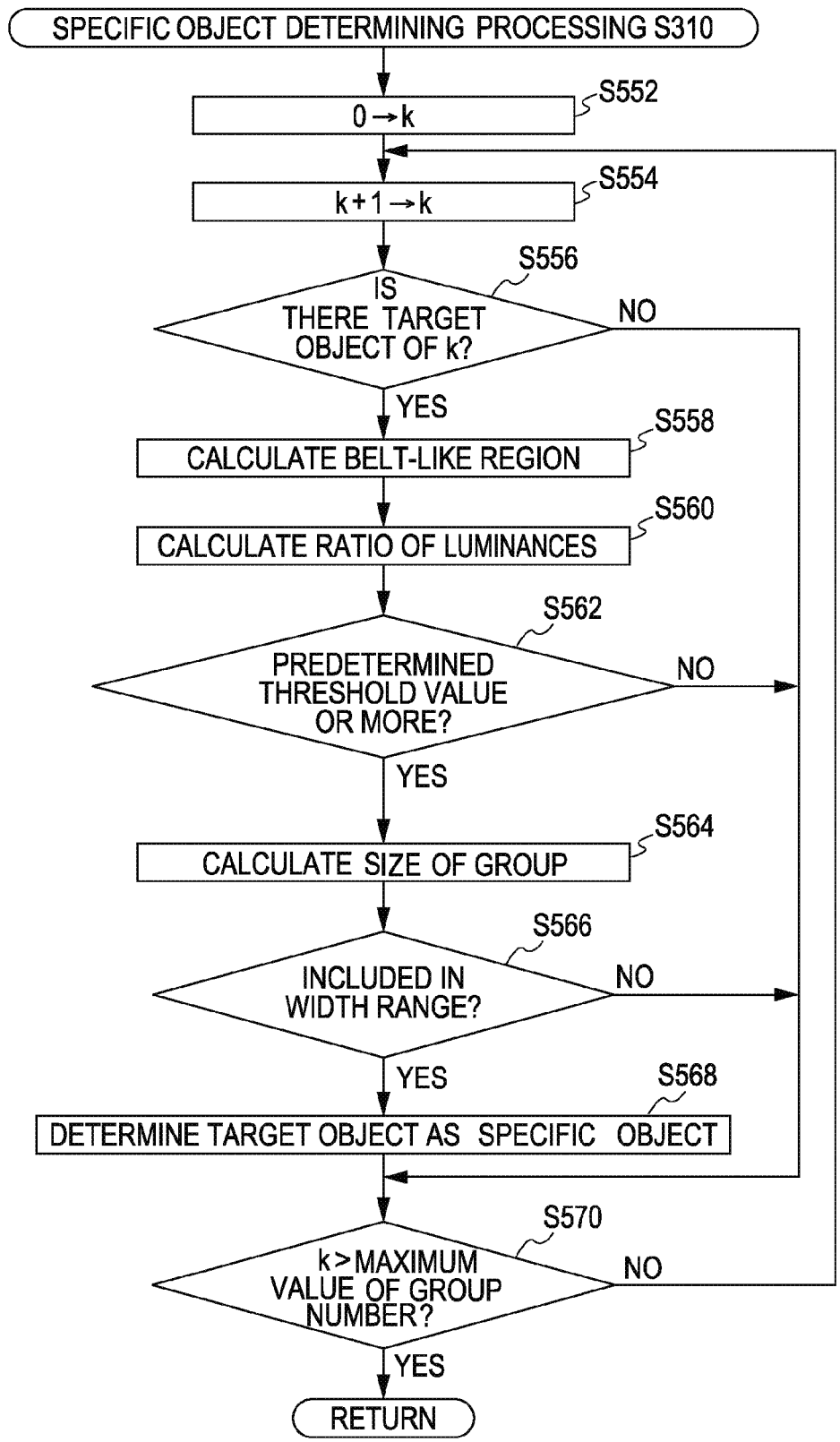
FIG. 17 is a flowchart illustrating a flow of specific object determining processing.

As shown in FIG. 17, the specific object determining unit 172 initializes (substitutes "0" to) a group variable k for specifying a group (S552). Subsequently, the specific object determining unit 172 adds "1" to the group variable k (S554).

The specific object determining unit 172 determines whether or not there is a target object of which group number g is the group variable k from the luminance image 124 (S556). When there is such target object (YES in S556), the specific object determining unit 172 calculates the size of the target object to which the group number g is given (S558). More specifically, the specific object determining unit 172 obtains upper and lower end portion coordinates (upper end ymax, lower end vmin) in the vertical direction of the image of the target object and right and left end portion coordinates in the horizontal direction (left end xl, right end xr). Then, the center of the belt-like region 222 in the transverse direction is set between a coordinate (xl, (ymax+ymin)/2) and a coordinate (xr, (ymax+ymin)/2), and the width in the transverse direction is set at any given number of pixels. Subsequently, the specific object determining unit 172 determines whether or not the luminances of each target portion in the belt-like region 222 is included, in the luminance range of the specific object, calculates the ratio of the target portions included in the luminance range with respect to all the target portions (S560), and determines whether or not the ratio is equal to or more than the predetermined threshold value (S562).

When the ratio of target portions of which luminances are included in the luminance range of the specific, object is equal to or more than the predetermined threshold value (YES in S562), the specific object determining unit 172 calculates the size of the target object to which the group number g is given (S564). The size of the target object is specified by a horizontal direction component, that is a horizontal distance (difference) between the pixel located at the left end on the image of the target object and the pixel located at the right end on the image and a vertical direction component that is a height (difference) between the pixel located at the upper end on the image of the target object and the pixel located at the lower end on the image. The specific object determination unit 172 determines whether or not the calculated size is included in the width range 204 of the specific object indicated by the identification number p associated with the target object having the group number g which is the group variable k (S566). For example, when the horizontal direction component of the size of the target object falls within the width range 204 of the specific object "traffic light (red)", and when the vertical direction component of the size of the target object falls within the width range 204 of the specific object "traffic light (red)", the specific object determination unit 172 can determine that the target object is included in the width range 204 of the identified object "traffic light (red)".

When the size is included in the width range 204 of the specific object represented by the identification number p (YES in S566), the specific object determining unit 172 determines that the target object is the specific object (S568). When there is no target object of which group number g is the group variable k (NO in S566), when the size is not included in the width range 204 of the specific object represented by the identification number p (NO in S562), or when the size is not included in the width range 204 of the specific object represented by the identification number p (No in S566) the processing in step S570 subsequent thereto is performed.

Subsequently, the specific object determining unit 172 determines whether or not the group variable k is more than the maximum value of group number set in the grouping processing (S570). Then, when the group variable k is not more than the maximum value (NO in S570), the processings are repeated from the increment processing of the group variable k in step S554. When the group variable k is more than the maximum value (YES in S570), the specific object determining processing is terminated. As a result, the grouped target objects are formally determined to be the specific object.

As described above, the environment recognition device 130 can appropriately determine whether or not a target object is a specific object based on the luminance distribution of the target object even when the target object grouping unit 170 performs grouping against the intention, or when some of the multiple light sources overlap each other. Therefore, the accuracy of specifying the target object can be improved, whereby false recognition can be avoided.

In addition, a program for allowing a computer to function as the environment, recognition device 130 is also provided as well as a storage medium such as a computer-readable flexible disk, a magneto-optical disk, a ROM, a CD, a DVD, a ED storing the program. Here, the program means a data processing function described in any language or description method.

While a preferred embodiment of the present invention has been described hereinabove with reference to the appended drawings, it is to be understood that the present invention is not limited to such embodiment. It will be apparent to those skilled in the art that various changes may be made without departing from the scope of the invention.

For example, in the present embodiment, the three-dimensional position of the target object is derived based on the parallax between image data using the plurality of imaging devices 110. However, the present invention is not limited to such case. Alternatively, for example, a variety of known distance measuring devices such as a laser radar distance measuring device may be used. In this case, the laser radar distance measuring device emits laser beam to the detection area 122, receives light reflected when the laser beam is irradiated the object, and measures the distance to the object based on the time required for this event.

In the above embodiment, the specific object "traffic light (red)" is used for the explanation. However, the present invention may be applied to various specific objects such as the specific objects shown in the specific object table 200 of FIG. 4. For example, the "traffic light (yellow)", the "traffic light (blue)", the "tail lamp (red)", the "turn signal (orange)", and the like do not have any light source of the same color in proximity, and thus may be deemed as single emitting light. Therefore, the same determination, process as that for the "traffic light (red)" may be performed.

In the above embodiment, the belt-like regions 222 and 224 and the cross-like region 226 are used as the specific regions. Alternatively, for example, a belt-like region corresponding to a diagonal line inclining to the upper right, and a belt-like region inclining to the upper left may be adopted as the specific regions. In the image, multiple light sources are likely to be detected in a diagonally disposed manner. Accordingly, in the two regions, it is highly possible that there is a difference in the luminances in terms of statistics. Therefore, the specific object determining unit 172 may compare a summation or an average value of luminances in two inclined belt-like regions and determined a target object is a specific object when the difference is within a predetermined threshold value In the present embodiment, it is assumed that the imaging device 110 obtains a color image. However, the present invention is not limited to such case. Alternatively, a monochrome image may be obtained. In this case, the specific object table 200 is defined by a single-color luminance.

The above embodiment describes an example in which the position information obtaining unit 162 receives the distance image (parallax information) 126 from the image processing device 120, and generates the three-dimensional position information. However, the present invention is not limited to such case. The image processing device 120 may generate the three-dimensional position information in advance, and the position information obtaining unit 162 may obtain the generated three-dimensional position information. Such a functional distribution can reduce the processing load, of the environment, recognition device 130.

In the above embodiment, the luminance obtaining unit 160, the position information obtaining unit 162, the specific object provisional determining unit 164, the target portion grouping unit 166, the representative distance deriving unit 168, the specific object determining unit 172, and the pattern matching unit 174 are configured to be operated by the central control unit 154 with software. However, the functional units may be configured with hardware.

The specific object determining unit 172 determines a specific object by, for example, whether or not the size of the target object is included, in the width range 204 of the specific object. However, the present invention is not limited to such case. The specific object determining unit 172 may determine a specific object when various other conditions are also satisfied. For example, a specific object may be determined when a shift, the relative distance z in the horizontal, direction and the vertical direction is substantially constant (continuous) in a target object or when the relative movement, speed with respect to the z coordinate is constant. Such a shift in the relative distance z in the horizontal direction and the vertical direction in the target object may be specified by linear approximation by the Hough transform or the least squares method.

The steps of the environment recognition method in this specification do not necessarily need to be processed chronologically according to the order described in the flowchart. The steps may be processed in parallel, or may include processings using subroutines.

The present invention can be used for an environment recognition device and an environment recognition method for recognizing a target object based on the luminances of the target object in a detection area.

The invention claimed is:

1. An environment recognition device comprising:
a data retaining unit that retains association between ranges of luminance values and specific objects;
a luminance obtaining unit that obtains luminance values of target portions in a detection area of a luminance image;
a specific object provisional determining unit that provisionally determines that at least one first target portion, at least one second target portion and at least one third target portion among the target portions correspond to a specific object based on the luminance values of the first, second and third target portions by using the association retained in the data retaining unit;
a target portion grouping unit that groups the at least one first target portion and the at least one second target portion into a target object, when the at least one first target portion and the at least one second target portion are adjacent to each other;
a target object grouping unit that groups the at least one third target portion and the target object into a grouped target object, when a distance between the at least one third target portion and the target object is in predetermined ranges; and
a specific object determining unit that determines that the grouped target object is the specific object when a ratio is equal to or more than a predetermined threshold value and determines that the grouped target object is another specific object when the ratio is less than the predetermined threshold value,
wherein the ratio is calculated by: (a number of the target portions within a specific region of the grouped target object, of which luminance values are within a predetermined luminance range)/(a number of all target portions within the specific region of the grouped target object).

2. The environment recognition device according to claim 1, wherein the specific region is a belt-like region extending in a horizontal direction passing through a center of the grouped target object in a vertical direction.

3. The environment recognition device according to claim 1, wherein the specific region is a belt-like region extending in the vertical direction passing through the center of the grouped target object in the horizontal direction.

4. The environment recognition device according to claim 2, wherein the specific region is a belt-like region extending in the vertical direction passing through the center of the grouped target object in the horizontal direction.

5. The environment recognition device according to claim 1, wherein the specific object is a light-emitting portion of a traffic light.

6. The environment recognition device according to claim 2, wherein the specific object is a light-emitting portion of a traffic light.

7. The environment recognition device according to claim 3, wherein the specific object is a light-emitting portion of a traffic light.

8. The environment recognition device according to claim 4, wherein the specific object is a light-emitting portion of a traffic light.

9. An environment recognition method comprising:
obtaining luminance values of target portions in a detection area of a luminance image;
provisionally determining that at least one first target portion, at least one second target portion and at least one third target portion among the target portions correspond to a specific object based on the luminance values of the first, second and third target portions by using association between luminance ranges and specific objects, the association being retained in a data retaining unit;
grouping the at least one first target portion and the at least one second target portion into a target object, when the at least one first target portion and the at least one second target portions are adjacent to each other;
grouping the at least one third target portion and the target object into a grouped target object, when a distance between the at least one third target portion and the target object is in predetermined ranges; and
determining that the grouped target object is the specific object when a ratio is equal to or more than a predetermined threshold value and determining that the grouped target object is another specific object when the ratio is less than the predetermined threshold value,
wherein the ratio is calculated by: (a number of the target portions within a specific region of the grouped target object, of which luminance values are within a predetermined luminance range)/(a number of all target portions within the specific region of the grouped target object).

10. The environment recognition device according to claim 1, wherein the distance between the at least one third target portion and the target object is measured horizontally and vertically.

11. The environment recognition method according to claim 9, wherein the distance between the at least one third target portions and the target object is measured horizontally and vertically.

12. An environment recognition device comprising:
an input unit configured to input a luminance image;
a central control unit configured to determine a specific object based on a luminance value of the input luminance image; and
an output unit configured to output a determined result, wherein:
the central control unit implements to extract pixels having a specific luminance value, and group the extracted pixels that are adjacent to each other or fall within a predetermined range, into a group,
the central control unit determines that the group is a candidate of the specific object when a ratio is equal to or more than a predetermined threshold value and determines that the group is a candidate of another specific object when the ratio is less than the predetermined threshold value, the ratio being calculated by:

(a number of pixels within a specific region of the group, of which luminance values are within a predetermined luminance range)/(a number of all pixels within the specific region of the group).

* * * * *